United States Patent
Mancisidor et al.

(10) Patent No.: US 7,031,951 B2
(45) Date of Patent: Apr. 18, 2006

(54) EXPERT SYSTEM ADAPTED DEDICATED INTERNET ACCESS GUIDANCE ENGINE

(75) Inventors: Rod Mancisidor, Round Rock, TX (US); Charles R. Erickson, Cedar Park, TX (US); Gordon Gilpin, Austin, TX (US)

(73) Assignee: Convergys Information Management Group, Inc., Cincinnati, OH (US)

( * ) Notice: Subject to any disclaimer, the term of this patent is extended or adjusted under 35 U.S.C. 154(b) by 410 days.

(21) Appl. No.: 09/909,241

(22) Filed: Jul. 19, 2001

(65) Prior Publication Data

US 2002/0116243 A1 Aug. 22, 2002

Related U.S. Application Data

(60) Provisional application No. 60/219,783, filed on Jul. 19, 2000.

(51) Int. Cl.
*G06F 17/00* (2006.01)

(52) U.S. Cl. .......................................... 706/60
(58) Field of Classification Search .................. 706/60, 706/925, 8; 705/7
See application file for complete search history.

(56) References Cited

U.S. PATENT DOCUMENTS

| | | | |
|---|---|---|---|
| 4,949,278 A | | 8/1990 | Davies et al. |
| 4,992,940 A | | 2/1991 | Dworkin |
| 5,175,800 A | * | 12/1992 | Galis et al. ................. 706/45 |
| 5,309,355 A | | 5/1994 | Lockwood |
| 5,493,490 A | | 2/1996 | Johnson |
| 5,701,419 A | | 12/1997 | McConnell |
| 5,758,257 A | * | 5/1998 | Herz et al. ................. 725/116 |
| 5,784,539 A | * | 7/1998 | Lenz ............................ 706/45 |
| 5,809,282 A | | 9/1998 | Cooper et al. .............. 709/226 |
| 5,822,743 A | * | 10/1998 | Gupta et al. ................. 706/50 |
| 5,970,482 A | * | 10/1999 | Pham et al. ................. 706/16 |
| 5,983,220 A | | 11/1999 | Schmitt |
| 6,012,051 A | | 1/2000 | Sammon, Jr. et al. |
| 6,018,722 A | | 1/2000 | Ray et al. |
| 6,032,129 A | | 2/2000 | Greef et al. |
| 6,035,283 A | | 3/2000 | Rofrano |
| 6,067,525 A | | 5/2000 | Johnson et al. |
| 6,070,149 A | | 5/2000 | Tavor et al. |
| 6,088,722 A | * | 7/2000 | Herz et al. ................. 709/217 |

(Continued)

OTHER PUBLICATIONS

Feature object extraction—a fuzzy logic approach for evidence accrual in the Level 1 Fusion classification problem Stubberud, S.; Pudwill, R.; Computational Intelligence for Measurement Systems and Applications, Jul. 29–31, 2003 pp.: 181–185.*

(Continued)

*Primary Examiner*—Anthony Knight
*Assistant Examiner*—Michael B. Holmes
(74) *Attorney, Agent, or Firm*—Frost Brown Todd LLC

(57) ABSTRACT

An expert system adapted dedicated Internet access guidance engine. The invention allows an agent to interact with a customer and to provide selection and recommendation of data network products and/or services for the customer. The invention allows for the use of agents of varying skill levels, including relatively low skill level, without suffering deleterious performance. The dedicated Internet access guidance engine is operable to perform selection and rating of Internet access products and/or services to provide a solution that meets the needs of a customer. The dedicated Internet access guidance engine is operable to select recommended solutions from among a number of potential solutions that may include compatible solutions. The dedicated Internet access guidance engine is one of the underlying engines within the expert system that allows the agent to provide real time interaction with a customer and to provide a real time recommended solution to that customer.

33 Claims, 17 Drawing Sheets

U.S. PATENT DOCUMENTS

| | | | |
|---|---|---|---|
| 6,112,186 | A | 8/2000 | Bergh et al. |
| 6,119,101 | A | 9/2000 | Peckover |
| 6,125,356 | A | 9/2000 | Brockman et al. |
| 6,138,105 | A | 10/2000 | Walker et al. |
| 6,145,002 | A * | 11/2000 | Srinivasan .................. 709/225 |
| 6,169,979 | B1 | 1/2001 | Johnson |
| 6,219,654 | B1 | 4/2001 | Ruffin |
| 6,220,743 | B1 | 4/2001 | Campestre et al. |
| 6,233,609 | B1 | 5/2001 | Mittal |
| 6,236,978 | B1 * | 5/2001 | Tuzhilin ...................... 705/26 |
| 6,243,754 | B1 * | 6/2001 | Guerin et al. ............... 709/227 |
| 6,266,649 | B1 | 7/2001 | Linden et al. |
| 6,285,986 | B1 | 9/2001 | Andrews |
| 6,317,722 | B1 | 11/2001 | Jacobi et al. |
| 6,332,129 | B1 | 12/2001 | Walker et al. |
| 6,397,193 | B1 | 5/2002 | Walker et al. |
| 6,473,794 | B1 * | 10/2002 | Guheen et al. ............. 709/223 |
| 6,519,571 | B1 * | 2/2003 | Guheen et al. ............... 705/14 |
| 6,526,387 | B1 | 2/2003 | Ruffin et al. |
| 6,553,346 | B1 | 4/2003 | Walker et al. |
| 6,601,036 | B1 | 7/2003 | Walker et al. |
| 6,741,975 | B1 * | 5/2004 | Nakisa et al. .................. 706/47 |
| 6,745,172 | B1 * | 6/2004 | Mancisidor et al. .......... 706/60 |
| 2001/0014868 | A1 * | 8/2001 | Herz et al. .................... 705/14 |
| 2001/0044743 | A1 | 11/2001 | McKinley et al. |
| 2001/0044751 | A1 | 11/2001 | Pugliese, III et al. |
| 2001/0044759 | A1 | 11/2001 | Kutsumi et al. |
| 2001/0049632 | A1 | 12/2001 | Rigole ......................... 705/26 |
| 2001/0051893 | A1 | 12/2001 | Hanai et al. |
| 2002/0002502 | A1 | 1/2002 | Maes et al. |
| 2002/0004764 | A1 | 1/2002 | Stolze et al. |
| 2002/0010645 | A1 | 1/2002 | Hagen et al. |
| 2002/0036658 | A1 * | 3/2002 | Carolan et al. ............. 345/764 |
| 2002/0052767 | A1 * | 5/2002 | Yano ............................. 705/7 |
| 2002/0055890 | A1 | 5/2002 | Foley |
| 2002/0055906 | A1 | 5/2002 | Katz et al. |
| 2002/0107824 | A1 * | 8/2002 | Ahmed ........................ 706/46 |
| 2003/0061202 | A1 * | 3/2003 | Coleman ....................... 707/3 |
| 2003/0167222 | A1 * | 9/2003 | Mehrotra et al. ............ 705/37 |
| 2003/0191841 | A1 * | 10/2003 | DeFerranti et al. ......... 709/226 |
| 2004/0024656 | A1 * | 2/2004 | Coleman ..................... 705/27 |

OTHER PUBLICATIONS

Intelligent tutoring system: an expert–system trainer for herring roe grading Rahbari, R.; Meech, J.A.: de Silva, C.W.; American Control Conference, 1997. Proceedings of the 1997, vol.: 5, Jun. 4–6, 1997 pp.: 3171–3175 vol. 5.*

A prototype–centered approach to adding deduction capability to search engines–the concept of protoform Zadeh, L.A.; Fuzzy Information Processing Society, 2002. Proceedings. NAFIPS. 2002 Annual Meeting of the North American, 27–29 pp.: 523–525.*

A prototype–centered approach to adding deduction capability to search engines–the concept of protoform Zadeh, L.A.; Intelligent Systems, 2002. Proceedings. 2002 First International IEEE Symposium, vol.: 1, Sep. 10–12, 2002 pp.: 2–3 vol. 1.*

Cooperative dialog system for decision support and its response generationHarada, N.; Ishimaru, K.; Nukuzuma, A.; Furukawa, H.; Yamada, K.; Mizoguchi, R.; Fuzzy Systems, 1995. IEEE International Conference vol.: 2, Mar. 20–24 pp.: 825–830.*

Fuzzy queries against a crisp database over the Internet: an implementationKacprzyk, J.; Zadrozny, S.; Knowledge–Based Intelligent Engineering Systems and Allied Technologies, 2000. Fourth International Conference on, vol. 2, pp.: 704–707.*

User model for intelligent cooperative dialog system Ishimaru, K.; Harada, N.; Yamada, K.; Nukuzuma, A.; Furukawa, H.;□□Fuzzy Systems, 1999. Fourth IEEE International Conference on Fuzzy Systems 2, Mar. 20–24, 1995 pp.: 831–836 vol. 2.*

Fuzzy semantic measurement for synonymy and its application in an automatic question–answering system Sun, J.; Shaban, K.; Podder, S.; Karry, F.; Basir O; Kamel, M.; 2003. Proceedings. Oct. 26–29, 2003 pp.: 263–268.*

Fuzzy logic techniques applied to the control of a three–phase induction motor Afonso, J.L.; Fonseca, J.; Martins, J.S.; Couto, C.A.; Industrial Electronics, 1997. ISIE '97., Proceedings of the IEEE International Symposium on, Jul. 1997 pp.: 1179–1184.*

Residential environment regulation using intelligent fuzzy control MacConnell, P.F.; Sartorius, C.; Owens, D.H.; Two Decades of Fuzzy Control—Part 1, IEE Colloquium on, May 18, 1993 pp.: 10/1–10/5.*

Carchiolo et al., "An Agent Based Platform for a Service Provider", NEC Research Index Online, 1998, Retrieved for the Internet: http://citeseer.nj.nec.com/91085.html.*

Caswell et al., "Using Service Models for Management of Internet Services", IEEE Journal on Selected Areas in Communications, May 2000, vol. 18, Iss 5, pp. 686–701.*

McKnight et al., "Pricing Internet Services: Proposed Improvements", Computer, Mar. 2000, vol. 33, Iss 3, pp. 108–109.*

Gibbens et al., "Internet Service Classes Under Competition", IEEE Journal on Selected Areas in Communications, Dec. 2000, vol. 18, No. 12.*

Semret et al., "Pricing, Provisioning and Peering: Dynamic Markets for Diferentiated Internet Services and Implications for Network Interconnections", IEEE Journal on Selected Areas in Communications, Dec. 2000, vol. 18, No. 12, pp. 2499–2513.*

Bakos, Y., "The Emerging Role of Electronic Marketplaces on the Internet", Communications of the ACM, Aug. 1998, vol. 41 No. 8.*

Johnson et al., "Consulting Without Consultants: Expert Systems Applications in User Services", Proceedings of the 17th annua ACM SIGUCCS conference on User Services, 1989, pp. 335–342.*

Weiss, "The Seamless, Web–based Library: A Meta Site for the 21st Century," Proceedings of the 62nd ASIS Annual Meeting, vol. 36, Washington, D.C., Oct. 31–Nov. 4, 1999.

Brune et al., "A Resource Description Environment for Distributed Computing Systems," High Performance Distributed Computing, 1999 Proceedings, 8th International Symposium on Redondo Beach, CA, Aug. 3–6, 1999, Los Alamitos, CA, pp. 276–286.

Ferguson et al., "A Knowledge–based Sales Assistant for Data Communications Networks," IEEE, Jun. 10, 1987, vol. 3, pp. 1634–1642.

Ishiwa et al., "An Expert System for Planning Private Networks," NEC Research and Development, Nippon Electric Ltd., Tokyo, Japan, Jul. 1, 1994, vol. 35, No. 3, pp. 306–314.

Somers et al., "Intelligent Resource Dimensioning in ATM Networks," Proceedings of the International SWIT, Apr. 23, 1995, vol. 2, SYMP. 15, pp. 62–66.

European Search Report dated Jun. 13, 2002.

European Search Report dated Jun. 7, 2002.

Carchiolo, et al.; "An Agent Based Platform for a Service Provider"; Catania (Italy); pp. 1–7.

Caswell, et al.; "Using Service Models for Management of Internet Services"; IEEE Journal on Selected Areas in Communications, vol. 18, No. 5 (May 2000); pp. 686–701.

McKnight, et al.; "Pricing Internet Services: Proposed Improvements"; pp. 108–109.

Gibbens, et al.; "Internet Service Classes Under Competition"; IEEE Journal on Selected Areas in Communications, vol. 18, No. 12 (Dec. 2000); pp. 2490–2497.

Semret, et al.; "Pricing Provisioning and Peering: Dynamic Markets for Differentiated Internet Services and Implications for Network Interconnections" IEEE Journal on Selected Areas in Communications, vol. 18, No. 12 (Dec. 2000); pp. 2499–2513.

Bakos, Yannis; "The Emerging Role of Electronic Marketplaces on the Internet"; Communications of the ACM vol. 41, No. 8 (Aug. 1998); pp. 35–42.

"Consulting Without Consultants: Expert Systems Applications in User Services"; ACM SIGUCCS XVII (1989); pp. 335–341.

Office Action dated Jun. 22, 2005 for U.S. Application Ser. No. 09,909,250 filed Jul. 19, 2001.

* cited by examiner

EXPERT SYSTEM ADAPTED DEDICATED INTERNET ACCESS GUIDANCE ENGINE

CROSS REFERENCE TO RELATED APPLICATIONS

The present application claims priority pursuant to 35 U.S.C. Sec. 119(e) to U.S. Provisional Application Ser. No. 60/219,783, filed Jul. 19, 2000, now abandoned, which is hereby incorporated herein by reference in its entirety. The present application also claims priority pursuant to 35 U.S.C. Sec. 120 to U.S. Regular application Ser. No. 09/764,662, filed Jan. 18, 2001, pending, which is hereby incorporated by reference in its entirety.

The following U.S. patent applications are hereby incorporated herein by reference in their entirety and made part of the present U.S. patent application for all purposes:

1) U.S. patent application Ser. No. 09/909,250, entitled "EXPERT SYSTEM SUPPORTED INTERACTIVE PRODUCT SELECTION AND RECOMMENDATION," filed on even date herewith.
2) U.S. patent application Ser. No. 09/909,240, entitled "EXPERT SYSTEM ADAPTED DATA NETWORK GUIDANCE ENGINE," filed on even date herewith.

BACKGROUND

1. Technical Field

The present invention relates generally to expert system processing; and, more particularly, it relates to an expert system adapted dedicated Internet access guidance engine.

2. Related Art

Within conventional systems and methods that are operable to perform product selection and recommendation, a key limiting factor is the skill level of the agent or user who performs the customer or client interaction is selling and marketing those products. Within the scope of products, services are also envisioned as well within the context of the generic label "product." Regardless of the industry, the skill level of the agent in communicating the available products to a customer and, as is oftentimes the case, educating the customer and helping him to quantify his needs, are limiting factors that govern the degree of effectiveness that a particular salesperson can achieve. Within technology areas that are more amorphous and complex, the limitations of salespeople is even further compromised.

There have been a number of technology areas where the availability of adequately skilled salespersons has been limiting to the full tapping of the market. As one example, the Internet has rapidly become an indispensable system that many businesses require simply to conduct their day to day affairs. During Internet access blackouts within such industries, when the access to the Internet has been temporarily interrupted, it is evident the degree to which businesses have grown dependent on the availability and reliability of such services. Yet, as is often the case, there are relatively few individuals within the company who are able to seek adequate Internet services to meet the needs of their business. While there is this sometimes great limitation of sufficiently skilled individuals within customer-businesses that seek such services, when there are not sufficiently skilled and trained salespeople, or agents, to sell those services, the problem becomes ever more complex. The likelihood of a sufficient solution that will adequately satisfy the needs of the customer is relatively low.

The conventional solutions have been geared towards training the salespeople in such situations to a level at which they can adequately communicate and understand the technology that they are seeking to sell. This approach, while being effective for a particular individual once that individual is sufficiently trained, is catastrophic for an industry that has a high degree of turnover. In the example used above to illustrate the deficiency of this traditional approach, the turnover rate of individuals, once they have acquired a high skill level, is oftentimes astronomical. There is such a high need for specifically trained individuals in these key technology areas that the lateral opportunities are sometimes to good to pass up. Moreover, the problem is further complicated by the fact that companies in the business of selling such goods and services, namely providers, are loathe to invest a high degree of money and effort to train up their work base in light of the radical degree of turnover within the industry.

Another limitation within conventional approaches is the turn around time simply to provide a prospective customer with a list of available and operable options that may meet his needs. In some industries, given the high degree of technical complexity, there may be a turn around time of several weeks before a customer even gets an estimate or recommendation of products that may serve his needs. This latency is oftentimes extremely costly in terms of getting work up and running.

The frustration of customers who seek such products and services, when forced to deal with the all too often poorly qualified salespeople within their given industry, leads to an interaction that is less than effective. Oftentimes, both parties leave an interaction with a high degree of frustration. The conventional solution of simply trying to train up the sales force to a sufficiently high level so as to accomplish this desired effectiveness has simply been deficiency in light of many of the intrinsic limitations of the high technology industries. Moreover, even within relatively low technology level industries, there is oftentimes a great deal of "expert knowledge" that must or should be acquired before making an effective salesperson. Within these industries as well, the limitations of the skill level, experience, and expertise of the agent (salesperson) is often the limiting factor in the overall effectiveness of the solution.

Further limitations and disadvantages of conventional and traditional systems will become apparent to one of skill in the art through comparison of such systems with the present invention as set forth in the remainder of the present application with reference to the drawings.

SUMMARY OF THE INVENTION

Various aspects of the present invention can be found in an expert system adapted dedicated Internet access guidance engine. The expert system adapted dedicated Internet access guidance engine includes a dedicated Internet access guidance engine, a number of available Internet access products, customer need input concerning a number of dedicated Internet access guidance engine questions such that the customer needs are provided to the dedicated Internet access guidance engine. The dedicated Internet access guidance engine uses the customer need input to rate at least one available Internet access product of the number of available Internet access products, and the dedicated Internet access guidance engine selects a recommended Internet access solution, that is operable to meet a customer need, from among the number of available Internet access products and the rated at least one available Internet access product.

In certain embodiments of the invention, the dedicated Internet access guidance engine provides the recommended Internet access solution to an agent using a graphical user interface. The dedicated Internet access guidance engine may also provide a single Internet access solution (or several compatible Internet access solutions) and a single not recommended Internet access solution (or several not recommended Internet access solutions) to the agent using the graphical user interface. The rating of the at least one available Internet access product may involve determining a number of traits corresponding to the customer need such that the determination made using the customer need input. The number of traits includes a variety of traits that may include a cost, an ability to host a web site, a reliability, and a bandwidth. As an example of the granularity in which the various traits may be parsed, the bandwidth trait may further include information of various bandwidth needs that are required for various applications such as email, web browsing, web site hosting, file transfer, and voice over Internet protocol applications. The reliability may be determined by taking a maximum of a value indicative of a criticality of Internet use and a value indicative of a data type transmitted via the Internet. The customer need input may take several forms including both integer input form and Boolean input form. If desired, the ability to host a web site is treated as one of the Boolean inputs.

Other aspects of the present invention can be found in a dedicated Internet access guidance engine method used within an expert system. The method involves providing a number of dedicated Internet access guidance engine questions to a customer, receiving answers to those questions and providing those answers to dedicated Internet access guidance engine. The method also involves performing dedicated Internet access guidance engine processing to calculate a number of crisp values to represent a number of traits corresponding to a number of customer needs. The method may also involve transforming at least one crisp value of the number of crisp values to a fuzzy value to represent at least one trait within the number of traits with the fuzzy value; it is noted that some embodiments employ no crisp values at all, and they use only fuzzy values. The method also involves rating at least one available Internet access product within a number of available Internet access products, using the dedicated Internet access guidance engine, based on the fuzzy value. Again, in some embodiments, at least one crisp value within the number of crisp values is also used here; however, some embodiments employ only fuzzy values and no crisp values. Ultimately, the method involves recommending an Internet access solution, that is operable to meet the customer needs, from among the available Internet access products and the rated at least one available Internet access product.

In certain embodiments of the invention, the expert system also includes a data network guidance engine. The method may also involve providing the recommended Internet access solution to an agent using a graphical user interface. In addition, the method may also include providing a compatible Internet access solution and a not recommended Internet access solution to the agent using the graphical user interface. The method may also involve providing an explanation to the agent, using the graphical user interface, that explains why the recommended Internet access solution was recommended. The number of traits may include a cost, an ability to host a web site, a reliability, and a bandwidth. The ability to host a web site may be treated as a Boolean value. The crisp values may include both integer values and Boolean values.

Other aspects of the present invention can be found in a dedicated Internet access guidance engine method used within an expert system. The method involves performing real time interaction between a customer and an agent and providing a number of dedicated Internet access guidance engine questions to the customer. The method also involves receiving answers, corresponding to the dedicated Internet access guidance engine questions and inputting the answers into a dedicated Internet access guidance engine via a graphical user interface. The method also involves performing dedicated Internet access guidance engine processing to calculate a number of crisp values to represent a number of traits corresponding to a number of customer needs. The crisp values include a cost, an ability to host a web site, a reliability, and a bandwidth. The method also involves transforming at least one crisp value of the crisp values to a fuzzy value to represent at least one trait with the fuzzy value. The method also involves rating at least one available Internet access product within a number of available Internet access products, using the dedicated Internet access guidance engine, based on the fuzzy value and at least one crisp value within the plurality of crisp values, and recommending an Internet access solution, that is operable to meet the customer needs, from among the available Internet access products and the rated at least one available Internet access product. In addition, the rating of the at least one available Internet access product within a available Internet access products includes disqualifying the at least one available Internet access product when the at least one available Internet access product is inoperable to support web site hosting and when the ability to host a web site crisp value comprises a true value.

In certain embodiments of the invention, the rating of the at least one available Internet access product involves employing dynamic calculation. The ability to host a web site may include a Boolean customer need. If desired, a fuzzy value trait associated with bandwidth is generated from the at least one crisp value.

Other aspects, advantages and novel features of the present invention will become apparent from the following detailed description of the invention when considered in conjunction with the accompanying drawings.

BRIEF DESCRIPTION OF THE DRAWINGS

A better understanding of the present invention can be obtained when the following detailed description of various exemplary embodiments is considered in conjunction with the following drawings.

DETAILED DESCRIPTION OF THE INVENTION

Figure 1:
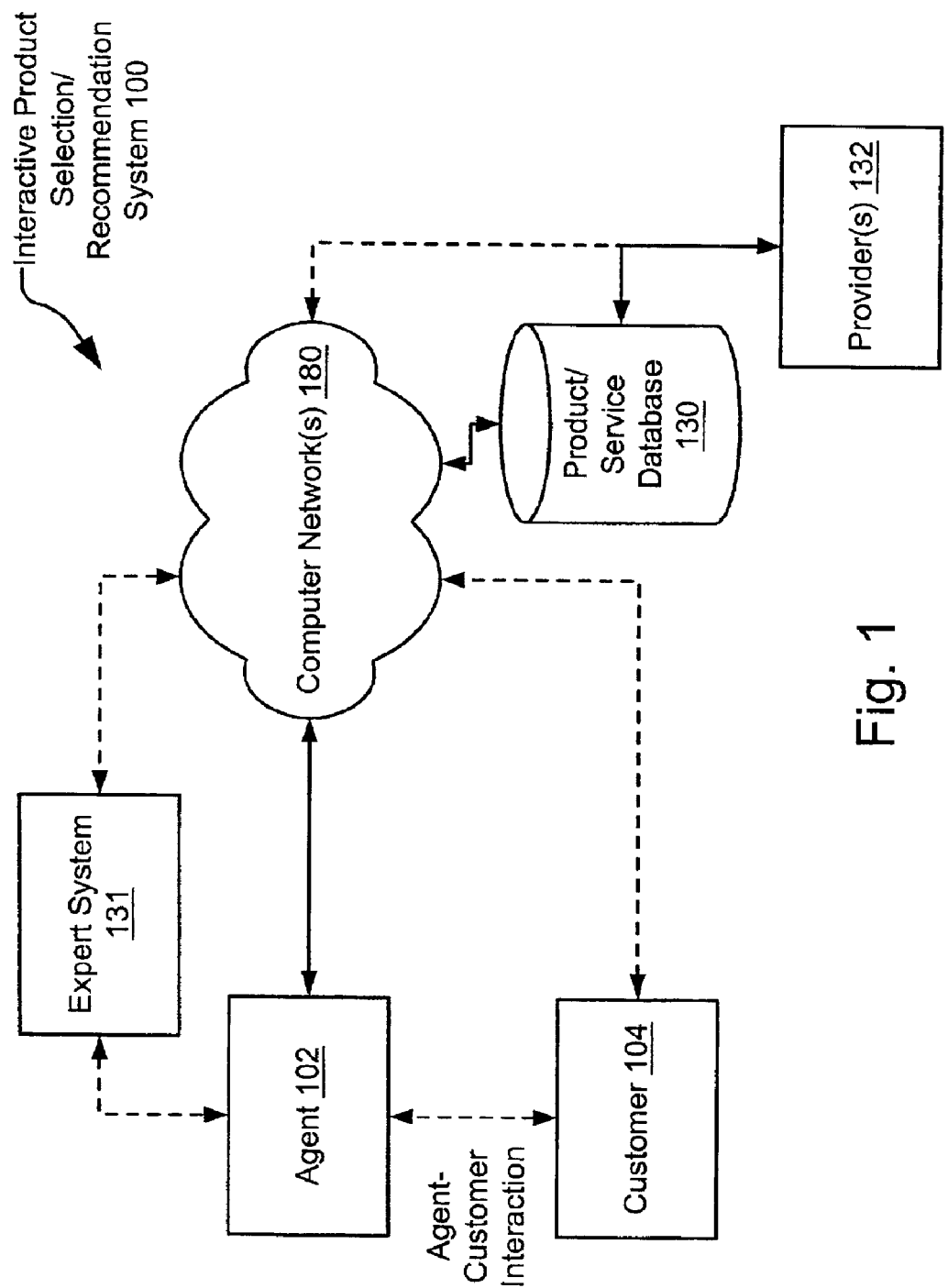
FIG. 1 is a system diagram illustrating an embodiment of an interactive product selection/recommendation system built in accordance with the present invention.

Within all of the various embodiments of the invention described below, the use of terminology of product or products is intended to include both services and products. The generic use of the term "products" or "product" is in no way to limit the operability of various aspects of the invention, as it is equally applicable within both industries selling and providing services, as well as those selling and providing products or combinations of services and/or products. For brevity, the term product is sometimes used instead of goods and/or services.

The invention is operable to allow and assist an agent to select certain solutions to meet the needs of a customer. In one embodiment, the invention is operable to help an agent select telecommunication technologies and products based on customer needs. In light of the comments made above regarding products and services, telecommunication technologies is also included within the scope and spirit of the terminology of "products and services" or simply, "products." The invention employs functionality offered within fuzzy logic expert systems. From certain perspectives, various aspects of the invention are based on fuzzy logic expert systems.

To assist an agent to select an amenable product for a customer, the problem domain must first be determined. The problem domain is the general area where the customer needs a solution. For example, Internet access would be one problem domain. Another one would be local data services. There are numerous problem domains where the functionality of the invention may assist an agent to find a customer solution. Once the problem domain is determined, the agent may then be presented with a set of questions relating to the needs of the customer with respect to that problem domain. The customer's answers are then transformed into values for each element of a set of product traits. In addition, the relative importance of each of the traits, from a customer's perspective, may also be considered.

A trait is a characteristic of a product of relevance to the user. These traits include any number of parameters and may include measurements such as cost, bandwidth, reliability, availability, etc. Each trait that is measurable in a continuum is represented as a fuzzy variable. Other traits are not measurable in a continuum, but are rather better represented as crisp values. One such example of a crisp value is the need for static IP addresses or the location of the site. These are represented with non-fuzzy values (crisp values). An expert system built in accordance with the invention then takes the collection of these values that represents the needs of the customer (one per trait, called needs) and attempts to match them against the corresponding collection of values provided by each product (called specs). Based on this, the expert system is operable to obtain a collection of ratings: one rating for each combination of product and trait. The expert system is also operable to summarize the ratings to give each product a summary rating. The summary rating of each product are used to sort them and classify them with respect to the level of recommendation assigned to each product.

In determining success of the operation of an expert system built in accordance with the invention, one consideration is that a customer belong to a set of "satisfied customers" once they deploy a solution suggested by an agent. In traditional set theory, an element either belongs to a set or does not. So, if customer satisfaction were treated in such a manner, then customers would either be "satisfied" or "dissatisfied." However, customers are rarely 100% satisfied or 100% dissatisfied. Their satisfaction usually falls somewhere in the middle.

The invention is operable using Fuzzy Sets. In Fuzzy Set Theory, an element does not have to belong to a set 0 or 100%. Instead, an element may belong to the set to a given degree. This type of model provides a lower semantic gap when working with sets that don't have precise mathematical definitions (as many don't). In fuzzy sets, each set has a corresponding membership function that maps all elements from the Universe of Discourse to a real number in the range [0, 1]. If the membership function maps an element to 1, then it completely belongs to the corresponding set. If it maps an element to 0, then it does not belong to the set at all. Other values provide a more fuzzy definition of whether the element belongs to the set. In the example of customer satisfaction, the membership function determines the level of satisfaction of a customer.

In many problems, the Universe of Discourse is a range of real numbers. As some examples: bandwidth, cost and reliability traits are all measurable and can be represented by real numbers. So, as an example, a fuzzy set may be created to represent the level of satisfaction of a customer who uses ISDN using the following membership functions as the spec of the ISDN product:

$P(x)=1$ for $x<=48$ $P(x)=2-x/48$ for $48<x$ and $x<96$ $P(x)=0$ for $x>=96$

Where x is measured in kbps. ISDN has a bandwidth of 64 kbps and in this case, the domain expert who came up with this membership function estimates that customers who need a bandwidth of 48 kbps or less will be completely satisfied with ISDN. Customers that need a bandwidth between 48 kbps and 96 kbps will have a linear reduction in their level of satisfaction. Finally customers who need 96 kbps or more will be completely dissatisfied with this solution. Presumably, we will be able to obtain this type of information from domain experts. This particular fuzzy set is meant only as an example.

On the other hand, the bandwidth requirements for a customer can rarely be estimated precisely. So, a fuzzy set can also be used to represent the bandwidth need of a customer:

$N(x)=0$ for $x<=50$ $N(x)=x/10-5$ for $x>50$ and $x<=60$ $N(x)=-x/10+7$ for $60<x$ and $x<=70$ $N(x)=0$ for $x>70$ This set represents a customer whose bandwidth need is estimated to be between 50 and 70 kbps. The set peaks at 60 kbps because it is the most likely bandwidth requirement. One assumption may be made: if the fuzzy set that represents a customer need is a subset of what is offered by a product, then it may be assumed that the customer will be perfectly satisfied. It may also be determined if there is no overlap, then the customer will be completely dissatisfied. If there is partial overlap there will be partial satisfaction. Fuzzy logic provides rules to determine the level of satisfaction.

There are at least three practical considerations that affect how fuzzy sets are represented. First, since fuzzy sets deal with concepts that are difficult to pin down, it is rare to come up with complex membership functions. Second, in order to simplify calculations, fuzzy sets are commonly defined with a set of linear functions. Third, although it is relatively easy to come up with equations for line segments, it quickly becomes bothersome. So, a common notation for fuzzy sets is shown as follows:

FUZZY-SET::=[POINTS]

POINTS::=POINT|POINT POINTS

POINT::=$Y/X$

Y::=<a number in the interval 0.0 to 1.0 inclusive>

X::=<any number>

The first $y_0/x_0$ point delimits a horizontal line from $(-\infty, y_0)$ to $(x_0, y_0)$. The last $y_n/x_n$ point delimits a horizontal line from $(x_n, y_n)$ to $(\infty, y_n)$. All other consecutive points $(x_i, y_i)(x_{i+1}, Y_{i+1})$ delimit straight lines.

As examples, the 2 membership functions defined above could be written as:

ISDN-BANDWIDTH-SATISFACTION=[1/48 0/96]

CUSTOMER-BANDWIDTH-NEEDS=[0/50 1/60 0/70]

Fuzzy sets defined with 2 coordinates are called Z Fuzzy Sets when $y_0>Y_1$. They are called S-Fuzzy Sets when $y_0<y_1$. This is in reference to the shape of the membership function. There are also triangular, rectangular and trapezoidal fuzzy sets, where the name is assigned based on the shape of the membership function.

In an expert system built in accordance with the invention, the use of Z and S Fuzzy Sets to define each trait of each product may be employed. For example, for traits where higher numbers are preferable, such as bandwidth and reliability (measured as MTBF or mean time between failures), a Z Fuzzy Set is used. For traits where lower numbers are preferred, such as cost or MTTR (Mean Time To Repair), an S Fuzzy Set is used. To represent customer needs we generally use triangular fuzzy sets, although other shapes are allowed and the expert system will work with any arbitrary membership function for any fuzzy set. When the needs of the customer are known precisely or where there are no means to "fuzzify" the needs of the customer, it is valid to use a crisp value to represent its needs. A crisp value is just a special case of a fuzzy value where the membership function evaluates to one on the crisp value and to zero elsewhere.

A common notation in Fuzzy Set Theory is that for a given Fuzzy Set A its membership function is also called A and defined as

A:UOD→[0, 1]

Where UOD is the Universe of Discourse. Using this notation we define the following set operations:

$C=A \cap B$ iff $C(x)=\min(A(x), B(x)) \forall x$ in UOD $C=A \cup B$ iff $C(x)=\max(A(x), B(x)) \forall x$ in UOD $C=\bar{A}$ iff $C(x)=1-A(x) \forall x$ in UOD The height of a set A is h(A) and is defined as the maximum value produced by its membership function.

When the spec of a product P is matched against the need N (where N is a crisp value), for a given trait, the fuzzy logic expert system produces P(N) as the matching measure.

When the spec of a product P is matched against the need N (where N is a fuzzy value), for a given trait, the fuzzy logic expert system proceeds as follows:

Good=$h(P \cap N)$

Bad=$h(\overline{P} \cap N)$

Rating=Good/(Good+Bad)

Rating is the matching measure. The rating formula described above is not in the literature. The customary way of obtaining the level of matching of 2 fuzzy sets is:

$h(P \cap N)$

This is, however, overly optimistic.

The concept of a fuzzy variable is relevant and important as well, because not all fuzzy sets are comparable. For example, a fuzzy set defined to represent the bandwidth of a product and one defined to represent the cost cannot be usefully compared. For this reason there is another concept called fuzzy variable. A fuzzy variable defines a Universe of Discourse. Each fuzzy variable stipulates a name for the UOD as well as its valid range of values and the unit of measurement.

Fuzzy variables in an expert system built in accordance with the invention are used to model traits. For example, to model bandwidth, a fuzzy variable with the domain [0, 100,000] is created where each unit represents one kbps.

A fuzzy value is a fuzzy set in the context of a fuzzy variable. This is what may be used in the expert system to represent a user need for a given trait or the spec of a product with respect to a given trait. A fuzzy set is like a number (e.g., 50); a fuzzy value is like a number with a unit of measurement and a meaning (e.g., $50 monthly cost.).

Various embodiments of the invention that employ an expert system operable according to the parameters described above are further fleshed out as shown in the various Figures and description below.

FIG. 1 is a system diagram illustrating an embodiment of an interactive product selection/recommendation system 100 built in accordance with the present invention. The interactive product selection/recommendation system 100 is operative using any number of computer network(s) 180. The computer network(s) 180 includes a single computer network or any number of computer networks that are communicatively coupled to one another.

A number of provider(s) 132 are able to provide any number of services and/or products to a customer 104. Each of the products that are furnished by the providers 132 is catalogued within a product/service database 130. The product/service database 130 is communicatively coupled to the computer network(s) 180. If desired, the providers 132 are also provided with communicative coupling to the computer network(s) 180 as well.

An agent 102 and the customer 104 interact via any number of communication means including telephone, Internet, or any other operable communication media. The agent 102 is able to access the various functionality of an expert system 131 while interacting with the customer 104. If desired, the agent 102 is able to perform accessing of expert system 131 while offline with respect to the customer 104. For example, the agent 102 is able to perform interaction with the customer 104 initially, then to use the expert system 131 to perform analysis and provide recommendations of what products should be provided to the customer 104. However, in one embodiment of the invention, the agent 102 is afforded the opportunity to perform real time interaction with the customer 104 and to use the various functionality of the expert system 131 to provide recommendation of products provided by the provider(s) 132 that would provide a suitable solution for the customer 104. It is also noted that the customer 104 himself may access all of the functionality of the various aspects of the present invention, in similar manner that the agent 102 access the functionality, in various embodiments as well. That is to say, the customer 104 may be given access to the same functionality that the agent 104 enjoys to the various aspects of the present invention.

The interactive product selection/recommendation system 100 allows for the ability of an agent 102 of relatively low skill level to provide recommendations to the customer 104 of the available products that proffered by the various provider(s) 132, borrowing on the various functionality of the expert system 131. The interactive product selection/recommendation system 100 is amenable to providing sales support for the providers 132 without requiring very highly skilled and trained salespersons within many niche industries that typically require an enormous amount of experience, expertise, and training.

Particularly within industries where there is a gross mismatch between availability of adequate and competent salespeople and the industry's customer demand, the interactive product selection/recommendation system 100 offers a system in which any one of the providers 132 is able to achieve significantly greater customer interaction and sales that that afforded using the conventional methods and systems that necessitate a great deal of training and expertise within a given industry before being able to provide adequate sales servicing. Whereas a conventional system is limited by the individual ability, expertise, and training of an agent operating within it, certain aspects of the invention provide for a system whose high end performance is not limited by the personal characteristics of the agents that operate it.

Figure 2:
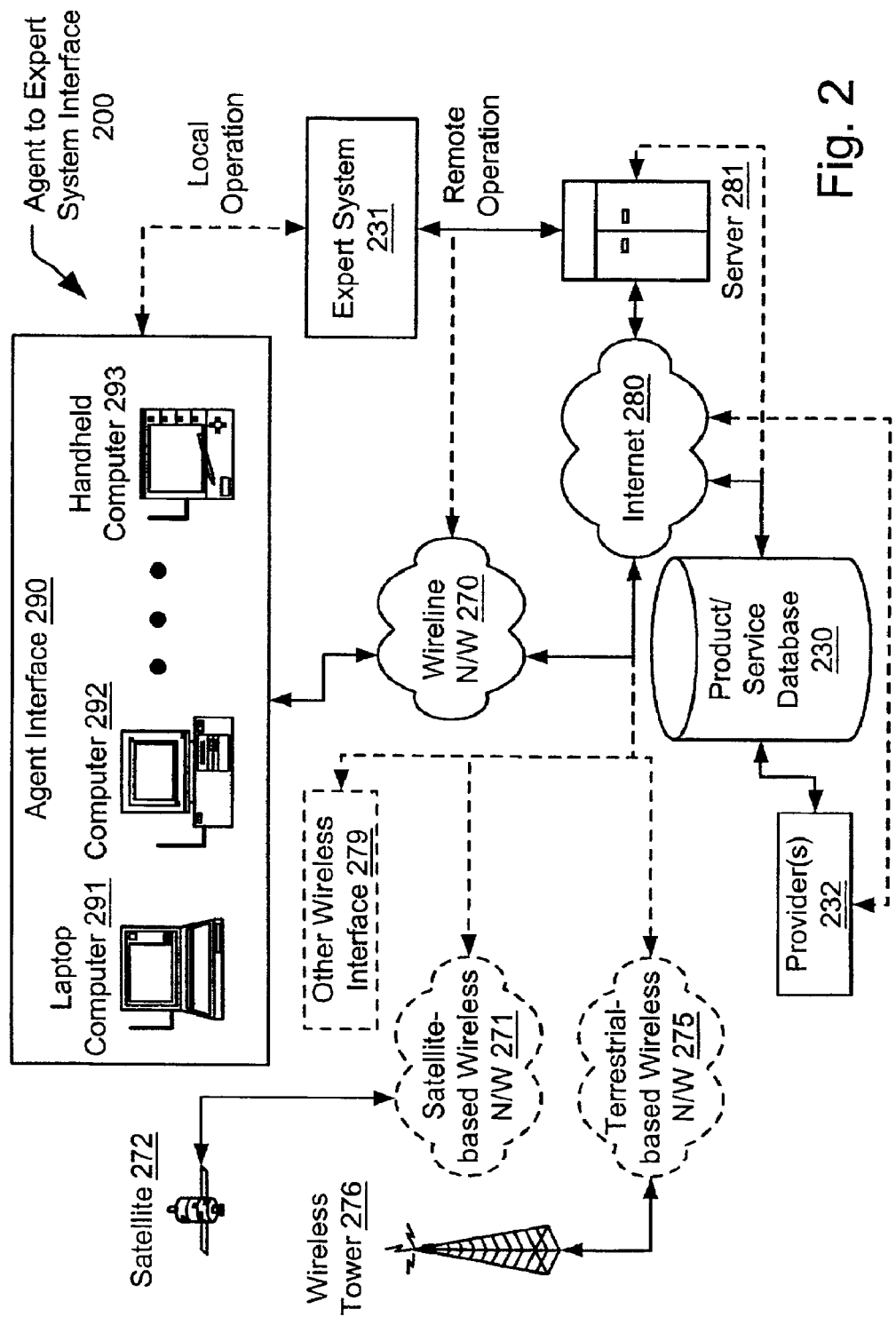
FIG. 2 is a system diagram illustrating an embodiment of an agent to expert system interface that is built in accordance with the present invention.

FIG. 2 is a system diagram illustrating an embodiment of an agent to expert system interface 200 that is built in accordance with the present invention. An agent is able to access an expert system 231 using an agent interface 290. The agent interface 290 includes any number of devices that allows for communicative coupling to the expert system 231. Examples of devices that are all operable as the agent interface include a laptop computer 291, a computer 292, ... and a handheld computer 293. In addition, any portable device that is operable to perform electronic interaction with the expert system 231 is also operable to serve the functionality of the agent interface 290.

The particular connection to the expert system 231 from the agent interface 290, that thereby allows agent interaction with the expert system 231, is achieved any number of ways without departing from the scope and spirit of the invention. For examples, it may be that the expert system 231 operates locally on the platform on which the agent is using as the agent interface 290. Alternatively, it is run remotely on a server 281 where the expert system 231 is accessed by the agent via any number of electronic connections. For example, the agent interface 290 is operable to access the expert system 231 (supported remotely by the server 281) via a wireline network 270 that communicatively couples the agent interface 231 to the expert system via the Internet. Also, the wireline network 270 may be operable to access the expert system 231 directly, without going through the Internet 280, if the wireline network 270 is operable to communicatively couple to the server 281 on which the expert system 231 is supported.

In even other embodiments, the agent interface 290 is operable to perform wireless connectivity to the wireline network 270 and/or the Internet 280. For example, each of the various platforms may be operable to perform the agent interface 280 may themselves be operable to perform wireless communication, as shown by the antennae on the laptop computer 291, the computer 292, . . . and the handheld computer 293. In such instances, the agent interface 280 is operable to connect to the wireline network 270 and/or the Internet 280. The wireless connectivity may be achieved using a satellite 272 that communicatively couples to a satellite-based wireless network 271, or alternatively using a wireless tower 276 that communicatively couples to a terrestrial-based wireless network 275. Generically, any other wireless interface 279 may be used to communicatively couple the agent interface to one of the wireline network 270 and/or the Internet 280 to allow interaction of the agent with the expert system 231 when the expert system 231 is operated remotely on the server 281. The term "server," for the server 281 is generically used to illustrate any number of computing platforms possessing sufficient processing resources to support the expert system 231.

The expert system 231 is operable also to access a product/service database 230. Again, as mentioned above and as will also be described in various embodiments of the invention below, the product/service database 230 is updated with the available products (including services) that may be sought by a customer. The listings of such available products may be provided via direct link by a number of provider(s)

232, or the providers 232 may provide the information to the product/service database 230 via the Internet 280. In addition, the server, on which the expert system 231 is supported for remote operation, may access the product/service database 230 directly via a dedicated link or via the Internet 280. It is understood that any number of dedicated wireline or wireless based connections, and/or networks, are also operable to perform the communicative coupling of the expert system 231 to the product/service database 230. The FIG. 2 illustrates a number of exemplary embodiments showing the connectivity and interaction of the agent interface 290 with the expert system 231 that allows for real time interaction of an agent with the expert system 231. The ability for real time interaction provides for a highly effective sales system as will be shown and described below in other of the various embodiments of the invention.

Figure 3:
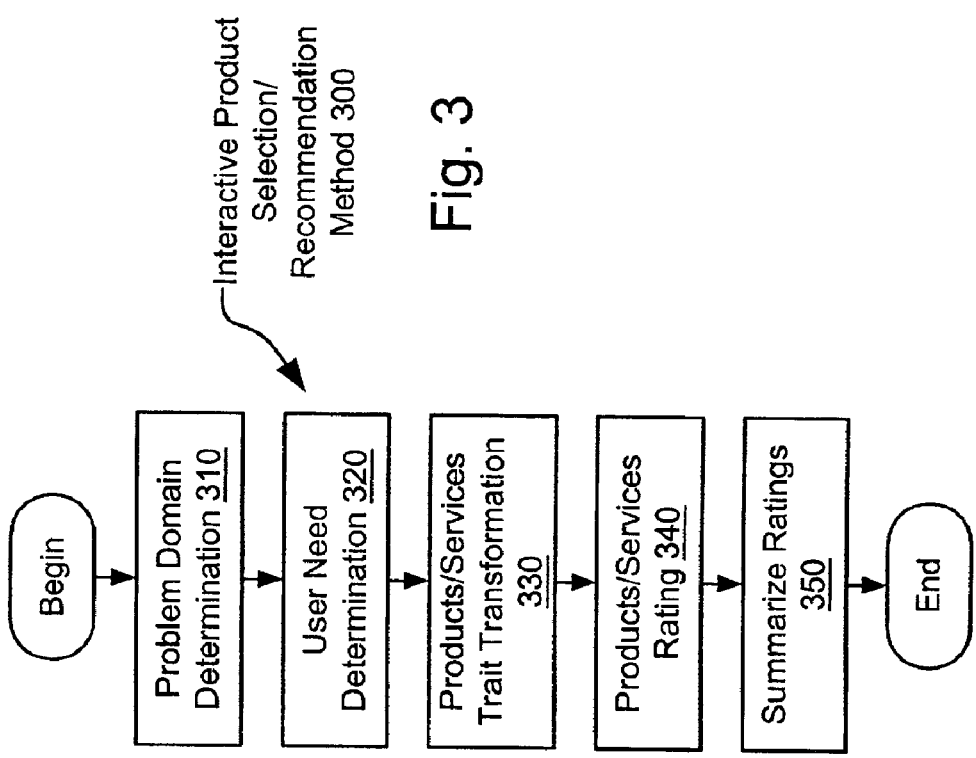
FIG. 3 is a functional block diagram illustrating an embodiment of an interactive product selection/recommendation method that is performed in accordance with the present invention.

FIG. 3 is a functional block diagram illustrating an embodiment of an interactive product selection/recommendation method 300 that is performed in accordance with the present invention. Initially, problem domain determination is performed as shown in a block 310. Subsequently, the user's, or customer's, need (or needs) are determined as shown in a block 320. Then, for proper processing within an expert system that is operable using various aspects of the invention, the available products/services and the user needs are used to perform trait transformation as shown in a block 330. During expert system processing, ratings for the available products/services are provide in a block 340. Ultimately, in a block 350, the ratings are then summarized for use by an agent.

The interactive product selection/recommendation method 300 is operable in real time where an agent may interact with a customer while inputting the customer's various needs and the agent can then provide recommendation to the customer. This recommendation is based on the customer's provided needs against the backdrop of the available products that are available to him. It may be that given the geographical location of the customer's site or sites that only a predetermined number of services are available to him. Such limitations are inherently provided for within the products/services rating that is performed in the block 340. As will also be shown in various embodiments of the invention below, the ratings summary provided for in the block 350 is able to also provide the underlying reasoning of why a particular solution is being recommended over other competing solutions. There is even greater detail provided, in certain embodiments, where compatible solutions are presented to the agent to provide for a more educated recommendation to a customer. In addition, detailed description of the available products is also available to a user of the interactive product selection/recommendation method 300 as well.

Figure 4:
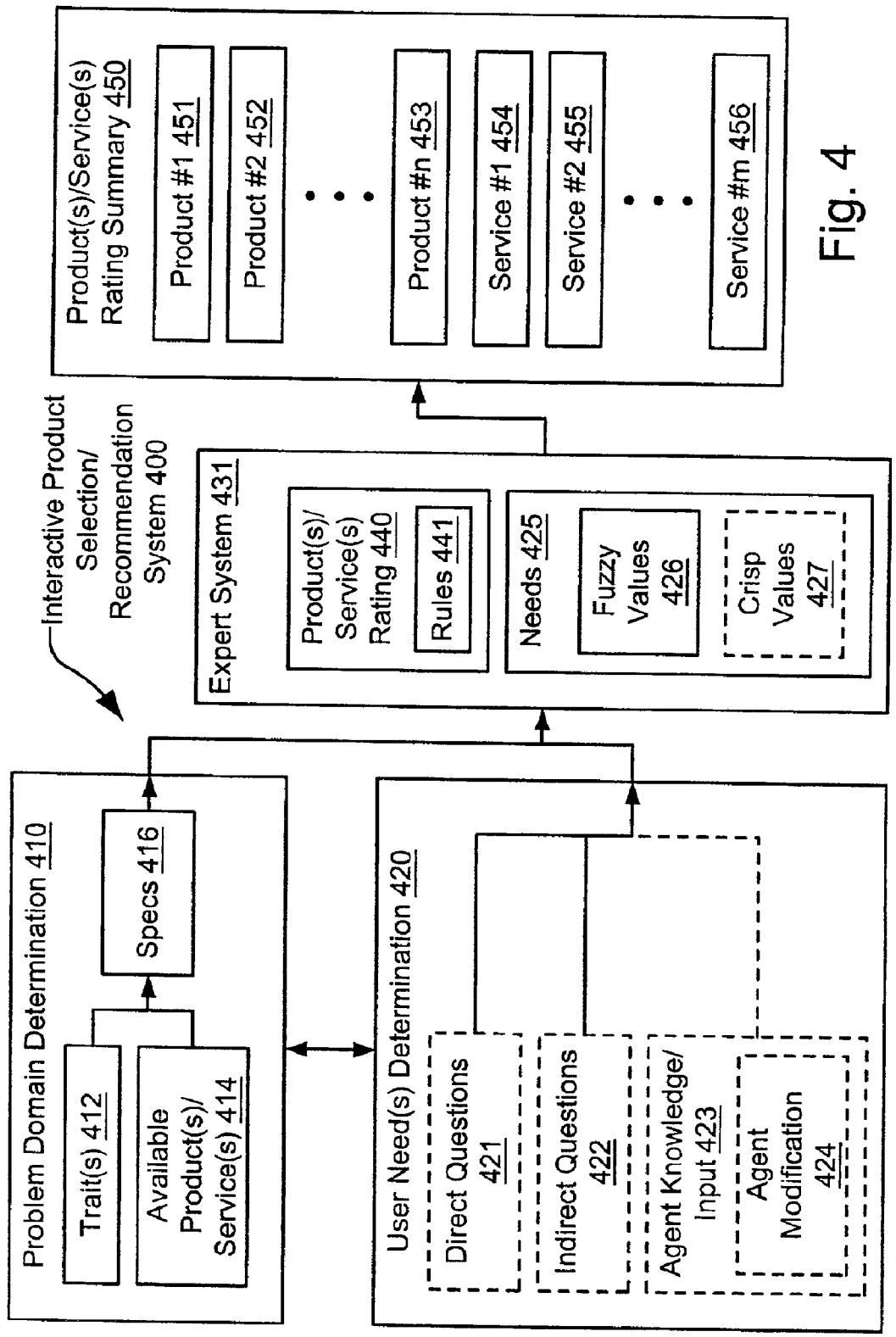
FIG. 4 is a system diagram illustrating another embodiment of an interactive product selection/recommendation system built in accordance with the present invention.

FIG. 4 is a system diagram illustrating another embodiment of an interactive product selection/recommendation system 400 built in accordance with the present invention. Within the interactive product selection/recommendation system 400, problem domain determination is illustrated in a functional block 410. The problem domain determination 410 is performed cooperatively within the context of user need(s) determination as shown in a functional block 420. These two functional blocks operate cooperatively to provide input for an expert system 431 that is operable to provide for a product(s)/service(s) rating summary 450.

Within the problem domain determination functional block 410, an indefinite number of trait(s) 412 and available product(s)/service(s) 414 are used to generate specs 416 that are used as input to the expert system 431. The traits 412 is a characteristic of a product and/or service that is relevant to a particular customer. The available product(s)/service(s) 414 also provide even greater detailed information of the various available product(s)/service(s) for the user of the interactive product selection/recommendation system 400. This greater detailed information may be accessed via a link, or selectable option, or in any manner known in the art.

This is correlated to the user need determination performed in the block 420. The user need determination 420 may be performed using a number of means including asking the customer direct questions 421 and indirect questions 422. In addition, the agent using the interactive product selection/recommendation system 400 is bound to posses some degree of knowledge, though it is understood that a novice or very inexperienced user (agent) may nevertheless use the interactive product selection/recommendation system 400 as well. In situations where the agent does posses a degree of knowledge, expertise, and skill, the agent's knowledge/input 423 may also be used to perform the user need determination 420. The agent may also make modifications of a number of default user needs as shown by a block 424. The agent may use the agent modification block 424 to override system input when his experience or skill level suggests doing so.

After using any of these various means to acquire knowledge, the user's needs determination block 420 provides input to the expert system 431 where the expert system 431 uses this information, along with information from the problem domain determination block 410, to generate user's needs as shown in a block 425. Within the context of expert systems, an indefinite number of fuzzy values 426 are generated. In certain instances, there are situations where a user need must be represented by a crisp value 427, or hard/rigid value. There are other instances are where no crisp values are used at all. An example of such an instance is where questions posed by an agent to a customer do not permit the user to convey a level of uncertainty. In such instances, that particular need or needs should be represented by crisp values 427. Another example of a situation that would best be represented by a crisp value 427 would be the actually availability of certain products in a given location. There may be a situation where only certain services are available in a particular city; such a situation is better represented using crisp values 427.

To state the concept of a crisp, or non-fuzzy value, in another way, some product traits are not measurable in a continuum. For those product traits that may not be represented or are not measurable using a continuum, a crisp value may be used. For example, the customer's physical location and the need for a static IP addresses have a bearing on the recommended product. These traits are not fuzzy. So, take support for static IP address, either a product supports it or not. If a product does not support it and the customer needs it, then, for this trait, the level of customer satisfaction is marked as zero. How this is summarized depends on the relative importance of this trait. The main difference with fuzzy traits is that for crisp traits traditional logic is used and in most cases it may be concluded that the customer is either 100% satisfied or 0% satisfied.

As mentioned briefly above, the specs 416 and the needs 425 are used as inputs to the expert system 431. The expert system 431 performs product(s)/service(s) rating 440 using an indefinite number of rules 441. The product(s)/service(s) rating summary 450 includes a ranking of an indefinite number of products and services, shown as a product #1 451, a product #2 452, . . . , and a product #n 453 and a service #1 454, a service #2 455, . . . , and a service #m 456. For a given problem, a sorted set of classified solutions is returned. The classification includes the level of customer satisfaction achieved by the product. There is a natural bifurcation of performing ratings of services in one instance, and performing ratings of products in another. However, there may be some instances where a product coupled with some services may also be rated. In addition, if the problem requires a product and a service, then the returned solutions will be configured with a specific set of products and a specific set of solutions.

There are many permutations in which the product(s)/service(s) rating summary 450 may be provided to an agent without departing from the scope and spirit of the invention. In one embodiment, the product(s)/service(s) rating summary 450 is provided in a document type of format that an agent may subsequently modify. One such example is the outputting of the product(s)/service(s) rating summary 450 into an MS WORD document that an agent may then edit before forwarding a report onto a customer.

Figure 5:
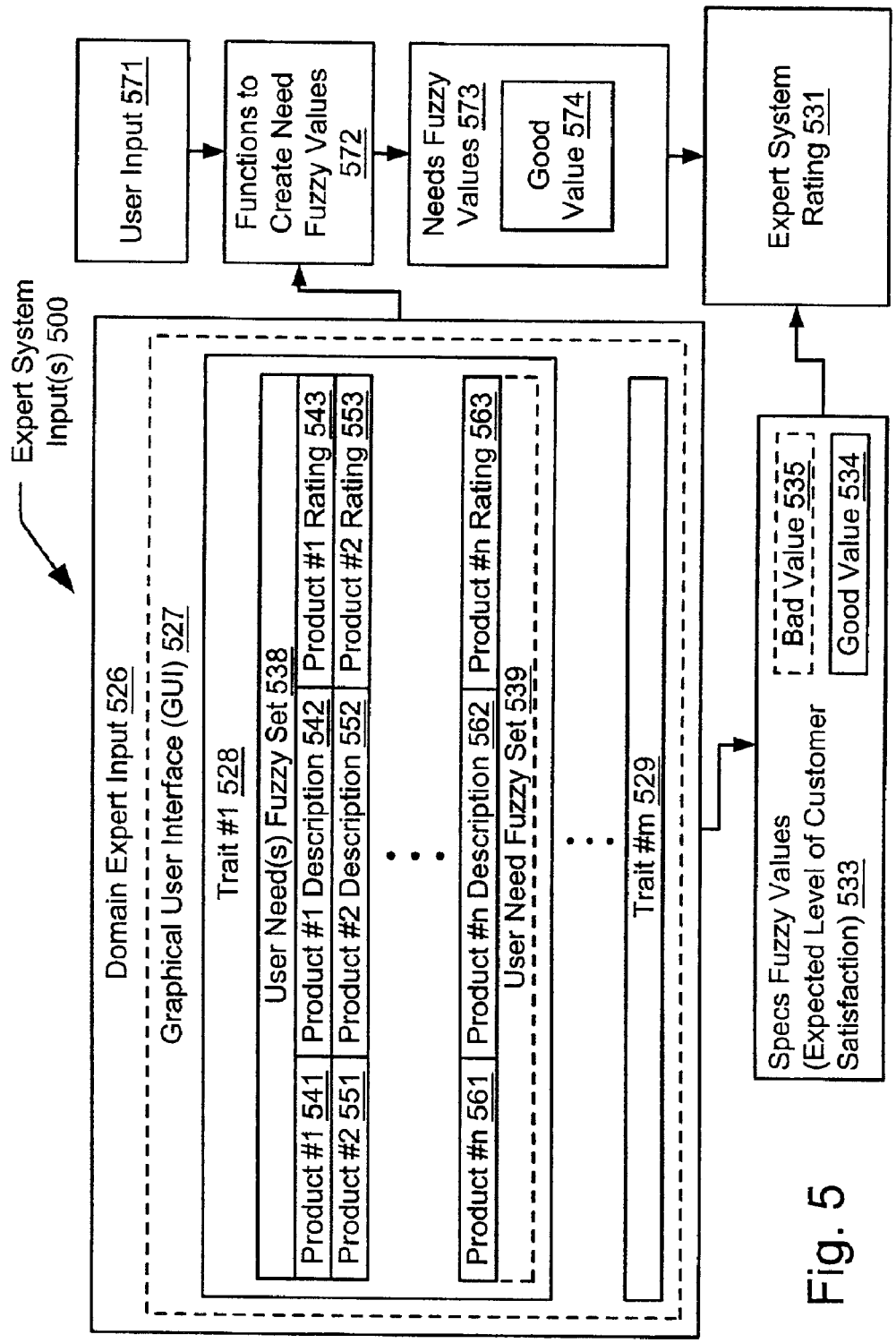
FIG. 5 is a block diagram illustrating an embodiment of some of the inputs that are usable within an expert system that is built in accordance with the present invention.

FIG. 5 is a block diagram illustrating an embodiment of some of the inputs 500 that are usable within an expert system that is built in accordance with the present invention. In this illustrated embodiment of expert system inputs 500, an optional graphical user interface 527 may be used to perform the expert system inputs 500. Alternatively, a file could be generated containing all of the information for use in an expert system. The GUI 527 is perhaps a more user-friendly manner to perform such inputs, especially in the context of lower skilled users of the expert system. The expert system takes in this information to perform expert system rating 531 using a number of inputs, including those that are provided by a user and by a domain expert. A user of the expert system is able to provide user input as shown in the functional block 571. In addition, the domain expert is able to provide his input via the functional block shown as domain expert input 526. Both the user input 527 and the domain expert input 526 are used to control and modify the functions used to create needs fuzzy values 573 for use within the expert system to perform expert system rating 531, as shown by the functional block 572. The needs fuzzy values 573 include a good value 574. These needs fuzzy values 573 are then provided to the expert system.

Similarly, the domain expert input 526 generates specs fuzzy values 533 that are also provided to perform the expert system rating 531. The specs fuzzy values 533 are representative of the expected level of customer satisfaction for the various information provided via the domain expert input 526. The specs fuzzy values 533 include a good value 534 and an optional bad value 535. The bad value may simply be the complement of the good value 534 in certain embodiments of the invention. These specs fuzzy values 533 are then provided to the expert system to perform expert system rating 531.

As mentioned above, the GUI 527 illustrated in this embodiment is illustrative of one manner in which the domain expert input 526 may be input into the expert system to perform expert system rating 531 that is operated using various aspects of the invention.

The GUI 527 may be presented as a table that the domain expert input 527 may use. For any number of traits, shown as a trait #1 528, . . . and a trait #m 529, various information may be provided in the tabular format. For example, as illustrated for the trait #1 528, a user need(s) fuzzy set may be located at the top (user need(s) fuzzy set 538) or bottom (user need(s) fuzzy set 539) of the table, as desired in a given situation. The table may be arranged showing the available products, followed by their description, and subsequently by their rank. This is shown graphically as a table arranged from left to right and top to bottom as follows: ($1^{st}$ line) product #1 541 followed by a product #1 description 542, followed by a product #1 rating 543; ($2^{nd}$ line) product #2 551 followed by a product #2 description 552, followed by a product #2 rating 553; . . . ($n^{th}$ line) product #n 561 followed by a product #n description 562, followed by a product #n rating 563. Other variations of the GUI 527 may be used without departing from the scope and spirit of the invention. The GUI 527 is exemplary one just one embodiment that is operable to achieve the domain expert input 526 in a user-friendly manner.

Figure 6:
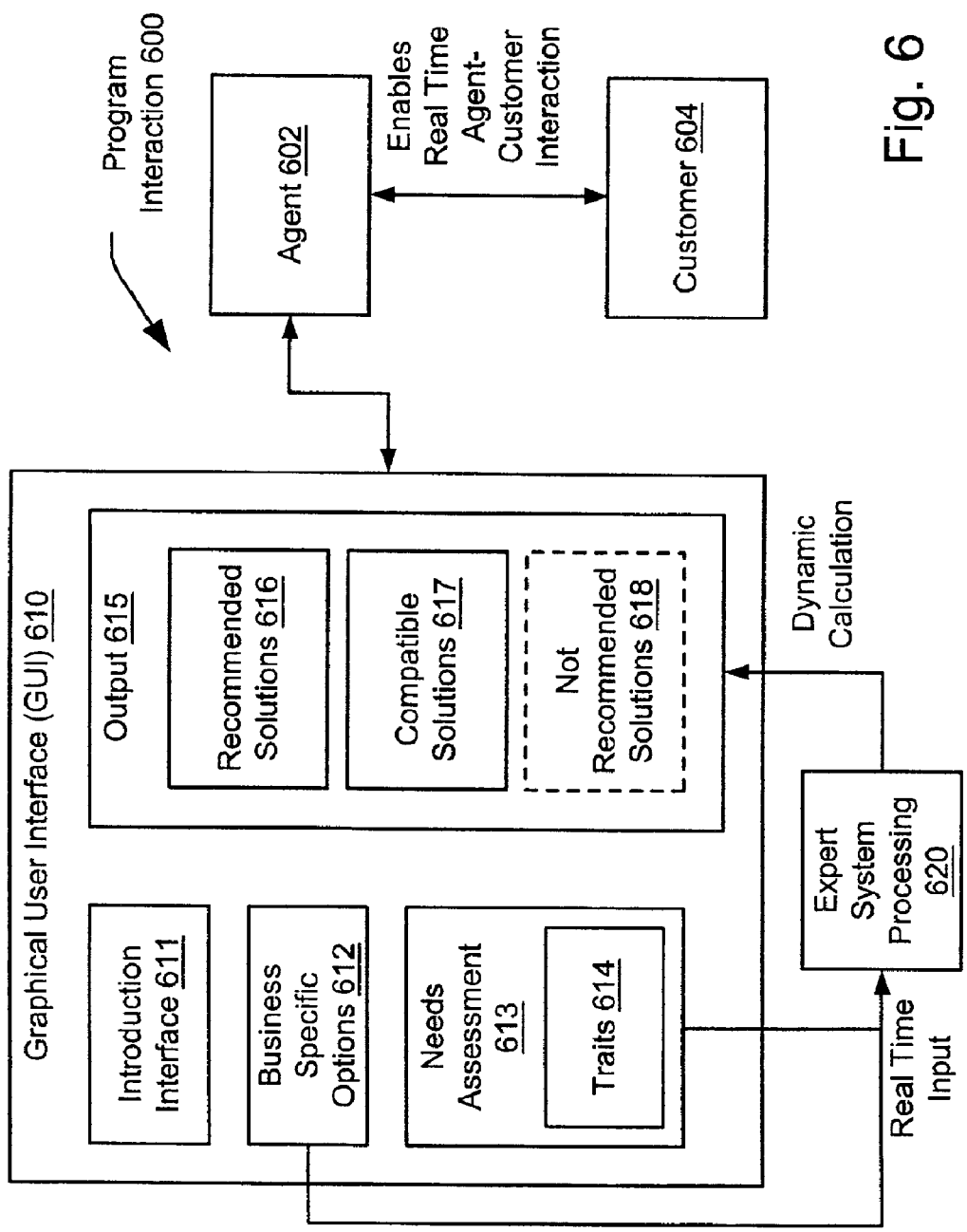
FIG. 6 is a block diagram illustrating an embodiment of program interaction with an expert system that is built in accordance with the present invention.

FIG. 6 is a block diagram illustrating an embodiment of program interaction 600 with an expert system that is built in accordance with the present invention. An agent 602 and a customer 604 are able to interact in real time while the agent 602 has access to the functionality of an expert system that is used to provide recommendations for the agent 602. The agent 602 is afforded access to the expert system via a GUI 610. The GUI 610 walks the agent 602 through a number of intuitively placed screens that assist him in providing effective recommendations to the customer 604. An introduction interface 611 is initially used when the agent 602 begins to invoke the functionality of the expert system that is accessed via the GUI 610.

The agent 602 is able to interact with the customer 604 in real time to perform input of business specific options 612 and to assess the needs of the customer 604, as shown by the needs assessment functional block 613. The business specific options 612 may include additional information regarding the various available products. As described above, any number of traits 614 may be used to perform the needs assessment. The expert system is able to receive these inputs from the business specific options 612 and the needs assessment functional block 613, including the traits 614, in real time. They are then provided to an expert system processing functional block 620. Then, the expert system provided output 615 is displayed via the GUI 610 after performing dynamic calculation. The limiting latency here is the latency of the connectivity between the GUI 610 and the expert system that is used to perform the expert system processing 620. The expert system processing is performed in nearly real time, having sub-second calculation time.

The output 615 includes recommended solutions 616, compatible solutions 617, and (if desired) not recommended solutions 618. In addition, within certain embodiments, an explanation is available for the agent 602 to describe even further the reasons why the particular solutions have been categorized into the various categories, namely, the recommended solutions 616, the compatible solutions 617, and the not recommended solutions 618. This can be most helpful during interaction with the customer, particularly when the customer desires a little more clarification of why a certain solution was recommended and why another was not. The real time input and dynamic calculation offered by the expert system built in accordance with the present invention allows the agent 602 to perform the entire fielding and servicing of a potential client during a single interaction. Compare this with the oftentimes multi-week-long turnaround in getting a customer a recommendation using conventional approaches. As an example, during a single telephone conversation between the agent 602 and the customer 604, the agent 602 is able to input all of the requisite information that the expert system requires. During the same telephone conversation, after the very short duration expert system processing 620, the agent 602 is able to provide virtually immediate recommendation to the customer 604.

The practically real time interaction that is afforded to the agent 602, as well as the explanation that is provided for the various options within the output 615, allow for a relatively inexperienced agent to perform recommendation for the customer 604. The agent 602 may lean on the offered functionality of the system to fill his deficiencies in terms of skill, expertise, and experience within the particular product area. The invention is also very desirable for product providers because they are able to employ relatively low skill level personnel to perform the selling of their products and/or services. This can ensure a greater profitability. Particularly within areas where there is a high degree of turnover, the invention allows a solution where a consistent level of expertise if proffered to the customer 604. In addition, in contexts where a high degree of skill is required to perform the sale of such products and/or services, a provider need not invest such a large amount of up-front effort to get a prospective employee into a position where he may be an effective salesperson or agent.

Figure 7:
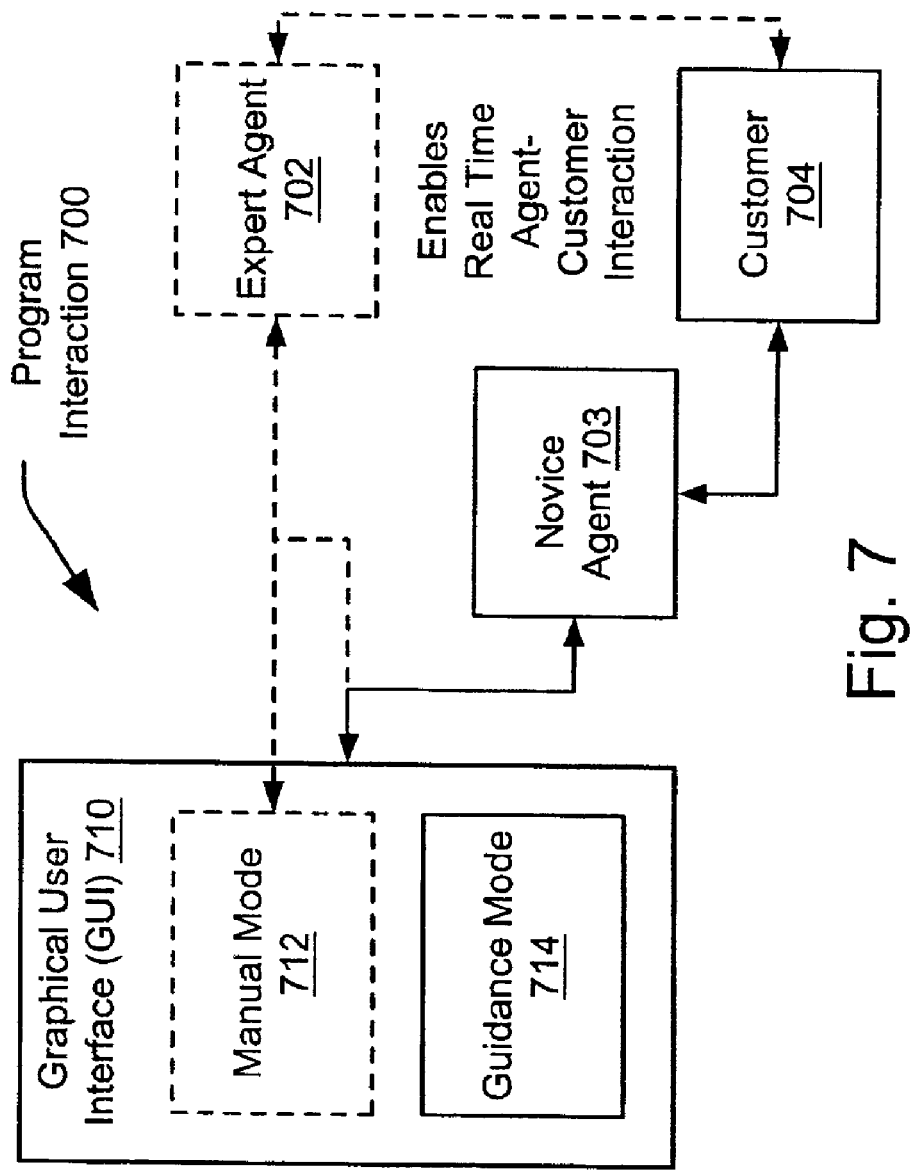
FIG. 7 is a block diagram illustrating another embodiment of program interaction with an expert system that is built in accordance with the present invention.

FIG. 7 is a block diagram illustrating another embodiment of program interaction with an expert system 700 that is built in accordance with the present invention. As described in the many variations of the invention shown above, and many that will be shown below as well, the invention is operable using agents of varying degrees without suffering deleterious effects from a customer perspective. As described above, the invention is operable without requiring a highly skilled or trained agent, as is typically required in solutions using conventional approaches.

The FIG. 7 shows a GUI 710 that allows operation for an agent in a number of multiple modes. Two exemplary modes are those of an (optional) manual mode 712 and a guidance mode 714. If desired, the invention is variable or adaptable depending on the skill level of an agent who desires to employ an expert system in accordance with certain aspects of the present invention. For example, a novice agent 703 may be allowed to access only the guidance mode 714 of the GUI 710 whereas an expert agent 702 may be allowed to access both the guidance mode 714 and a manual mode 712. A customer 704 is able to interact with any agent who employs the expert system, regardless of whether the agent be the novice agent 703 or the expert agent 702. As described above in various embodiments as well as within this embodiment, this interaction may be performed in real time agent-customer interaction.

The manual mode 712 allows for an agent to override any expert system processing. That is to say, the manual mode 712 allows an agent to operate using the GUI 710 in a manner analogous to that employed within conventional approaches, such as allowing the agent to perform the selection of products based on his own knowledge, expertise, and experience. Alternatively, the guidance mode 714 employs the expert system that is operable to perform guidance of the agent through the recommendation/selection process. Within either mode, the guidance mode 714 or the manual mode 712, the product description is made available to the agent to allow for further description of the various available products when interacting with the customer as also described above in various embodiments.

Figure 8:
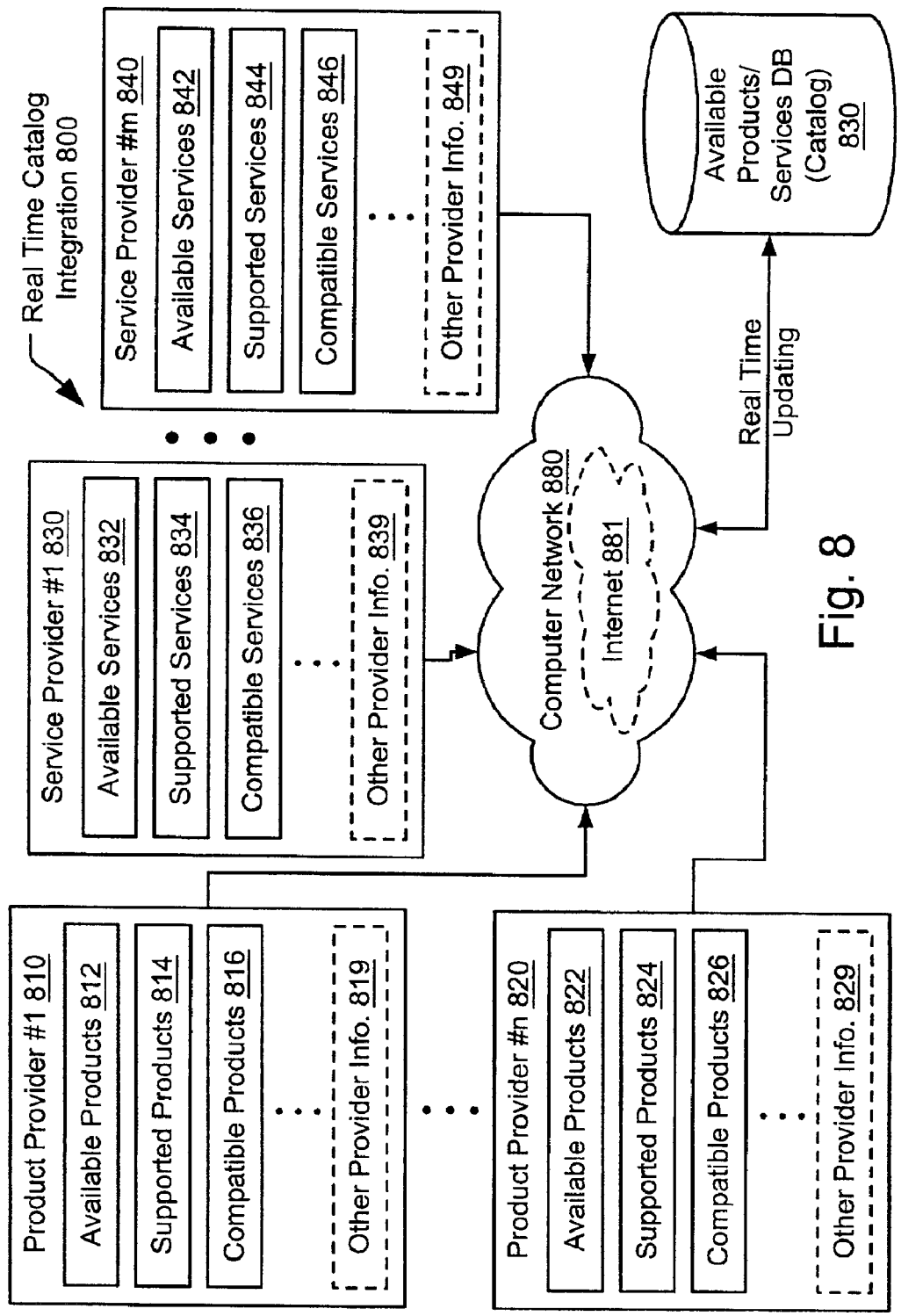
FIG. 8 is a block diagram illustrating an embodiment of real time catalog integration that is achieved in accordance using certain aspects of the present invention.

FIG. 8 is a block diagram illustrating an embodiment of real time catalog integration 800 that is achieved in accordance using certain aspects of the present invention. A computer network 880 is operable to perform real time updating of any number of various service and product providers into an available products/services database (catalog) 830. The available products/services database (catalog) 830 is also communicatively coupled to the computer network 880. The real time updating of the number of various service and product providers into the available products/services database (catalog) 830 ensures that the available products/services database (catalog) 830 is as up to date as the inventories listed for the various service and product providers' databases.

The computer network 880 may include the Internet 881 in certain embodiments of the invention. However, the computer network 880 may also be a dedicated network, such as a local area network (LAN) or other localized network, that is operable to communicatively couple the various service and product providers.

The databases of the various service and product providers are categorized in any number of manners. Exemplary information for the various databases are shown in the embodiment of the FIG. 8. For example, a database for a product provider #1 810 includes information such as a listing of available products 812, a listing of supported products 814, a listing of compatible products 816, . . . and a listing of any other provider information 819. Any number of other product providers may also be used as well without departing from the scope and spirit of the invention. For example, a database for a product provider #n 820 includes information such as a listing of available products 822, a listing of supported products 824, a listing of compatible products 826, . . . and a listing of any other provider information 829.

In addition, any number of service providers may also be integrated into the available products/services database (catalog) 830. For example, a database for a service provider #1 830 includes information such as a listing of available services 832, a listing of supported services 834, a listing of compatible services 836, . . . and a listing of any other provider information 839. Similarly, any number of other service providers may also be used as well without departing from the scope and spirit of the invention. For example, a database for a service provider #m 840 includes information such as a listing of available services 842, a listing of supported services 844, a listing of compatible services 846, . . . and a listing of any other provider information 849. Other information may also be included within the various databases for the various product and service providers without departing from the scope and spirit of the invention.

Figure 9:
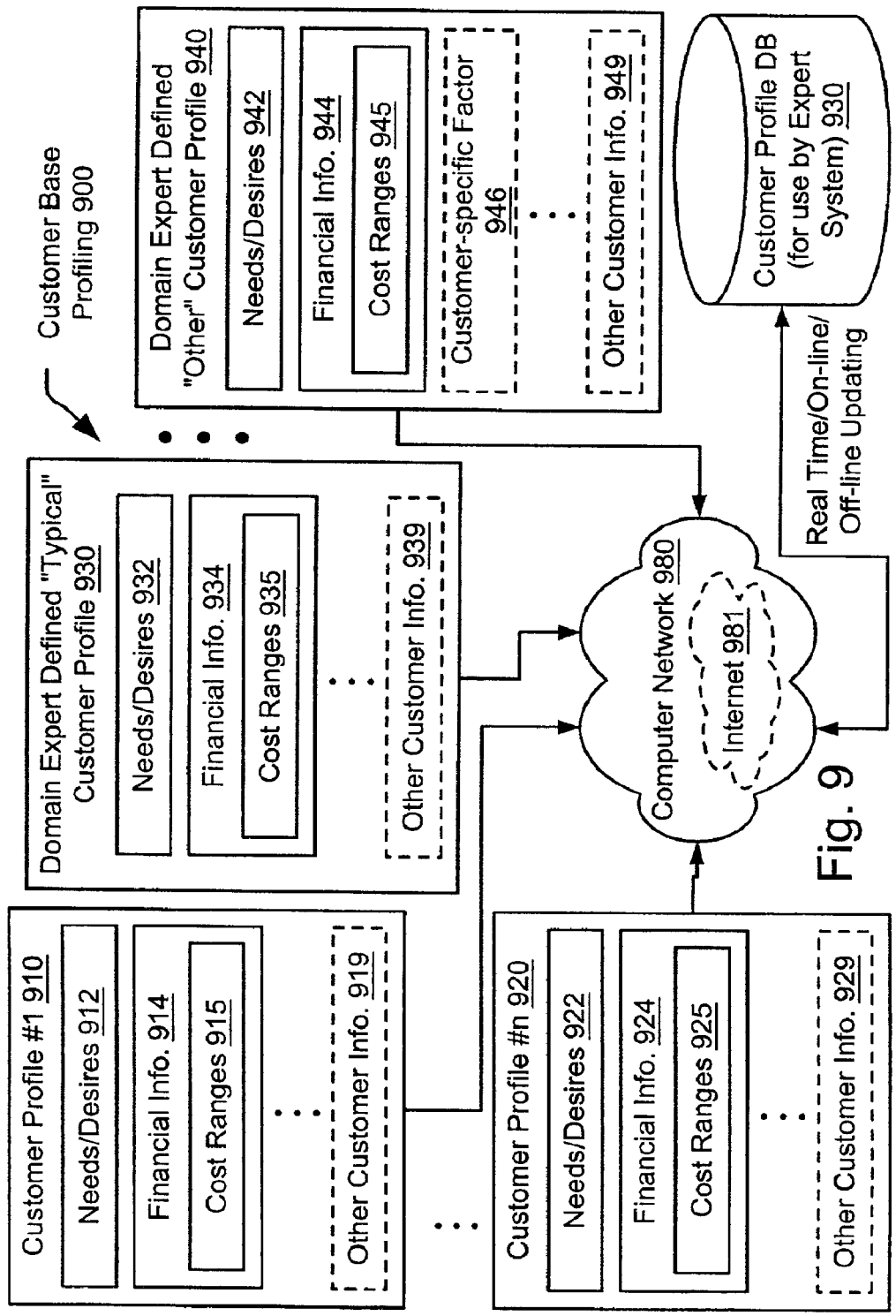
FIG. 9 is a system diagram illustrating an embodiment of customer base profiling that is achieved in accordance using certain aspects of the present invention.

FIG. 9 is a system diagram illustrating an embodiment of customer base profiling 900 that is achieved in accordance using certain aspects of the present invention. The customer base profiling 900 may be performed in an analogous manner in which the real time catalog integration 800 of the FIG. 8 is integrated and performed to generate the available products/services database (catalog) 830.

For example, a computer network 980 is operable to perform real time updating of any number of customer profiles into a customer profile database 930 that is used within an expert system. The customer profile database 930 is also communicatively coupled to the computer network 980. The updating of the number of various customer profiles is performed in any number of manners, including real time, on-line, and off-line, without departing from the scope and spirit of the invention.

The computer network 980 may include the Internet 981 in certain embodiments of the invention. However, the computer network 980 may also be a dedicated network, such as a local area network (LAN) or other localized network, that is operable to communicatively couple the various customer profiles.

The databases of the various customer profiles are categorized in any number of manners. Exemplary information for the various customer profile databases are shown in the embodiment of the FIG. 9. For example, a database for a customer profile #1 910 includes information such as needs/desires 912, financial information 914, . . . and any other customer information 919. If further desired, the financial information 914 may further include information concerning cost ranges 915. In some embodiments, the customer information may include the current services and products that a customer currently has at his disposal. The engines that the expert system employ to perform rating of products and/or services may also include taking this information into account when generating recommendations.

In addition, any number of other customer profiles may also be used as well without departing from the scope and spirit of the invention. For example, a database for a customer profile #n 920 includes information such as needs/desires 922, financial information 924, . . . and any other customer information 929 as well. Similarly, the financial information 924 may further include information concerning cost ranges 925.

In addition, the various customer profiles may also include any number of default or user defined profiles as well. For example, a "typical" customer profile, defined by a domain expert 930, may be used in certain embodiments of the invention. This domain expert defined "typical" customer profile 930 may include similar information as that provided by the customer profiles #1 910, . . . and the customer profiles #n 920. For example, the domain expert defined "typical" customer profile 930 may include information such as needs/desires 932, financial information 934, . . . and any other customer information 939. If further desired, the financial information 934 may further include information concerning cost ranges 935. However, the domain expert defined "typical" customer profile 930 may include different information as well as determined by the domain expert.

The domain expert may also define any number of "other" customer profiles, besides a simple "typical" customer profile. For example, a domain expert defined "other" customer profile 940 may include similar information as that provided by the customer profiles #1 910, . . . and the customer profiles #n 920. For example, the domain expert defined "other" customer profile 940 may include information such as needs/desires 942, financial information 944, . . . and any other customer information 949. If further desired, the financial information 944 may further include information concerning cost ranges 945. In addition, if desired by the domain expert, other factors may also be included as well. A customer-specific factor 946 is also included in certain embodiments of the invention, as determined by the domain expert.

Figure 10:
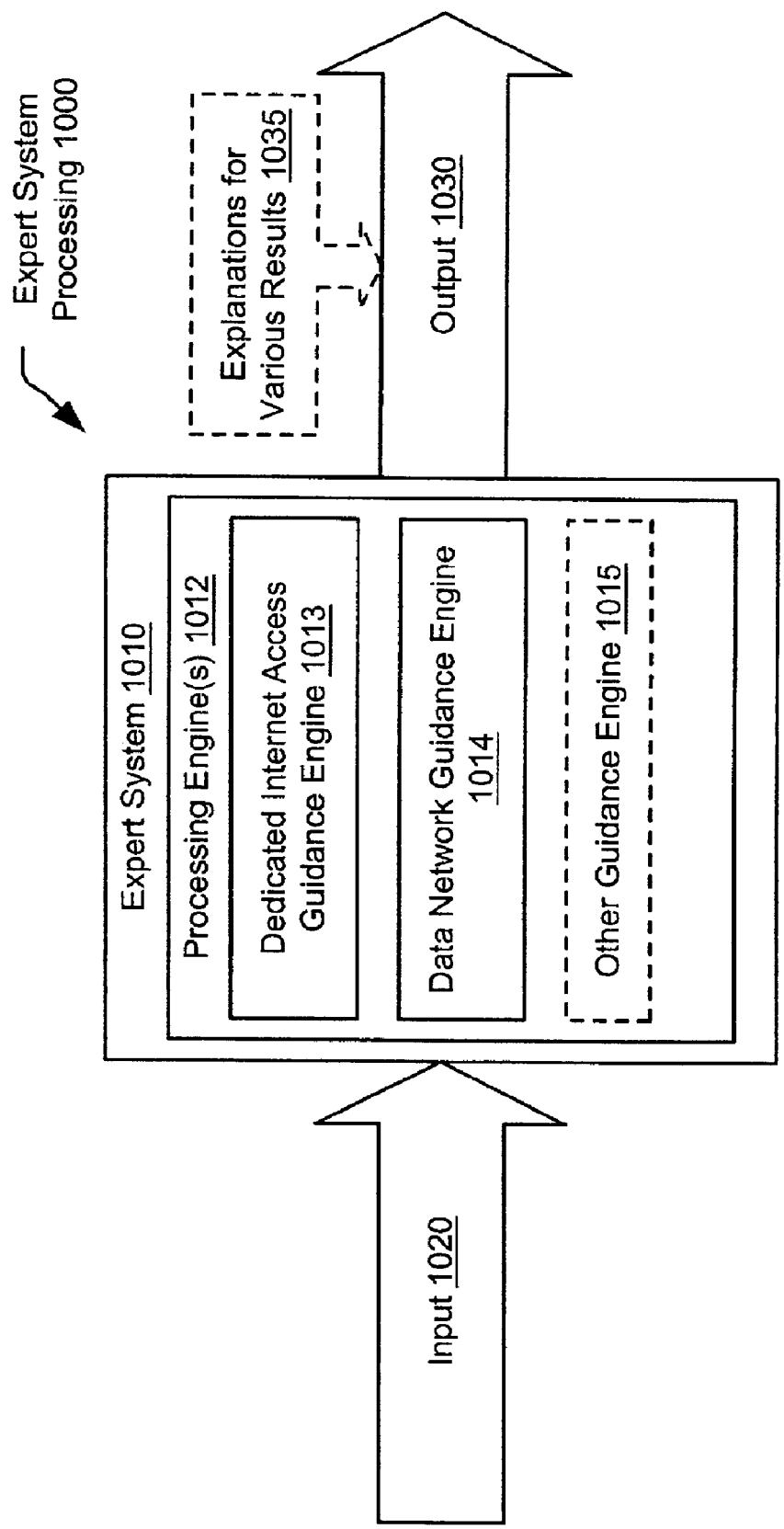
FIG. 10 is a system diagram illustrating an embodiment of expert system processing that is performed in accordance with the present invention.

FIG. 10 is a system diagram illustrating an embodiment of expert system processing 1000 that is performed in accordance with the present invention. Input is provided to an expert system 1010 to provide output 1030. In addition, the expert system 1010 employs a number of processing engine(s) 1012. The processing engine(s) 1012 include a dedicated Internet access guidance engine 1013 and a data network guidance engine 1014. In addition, any other number of guidance engines 1015 may also be employed without departing from the scope and spirit of the invention. If desired, the output 1030 includes explanations for the various results 1035.

Figure 11:
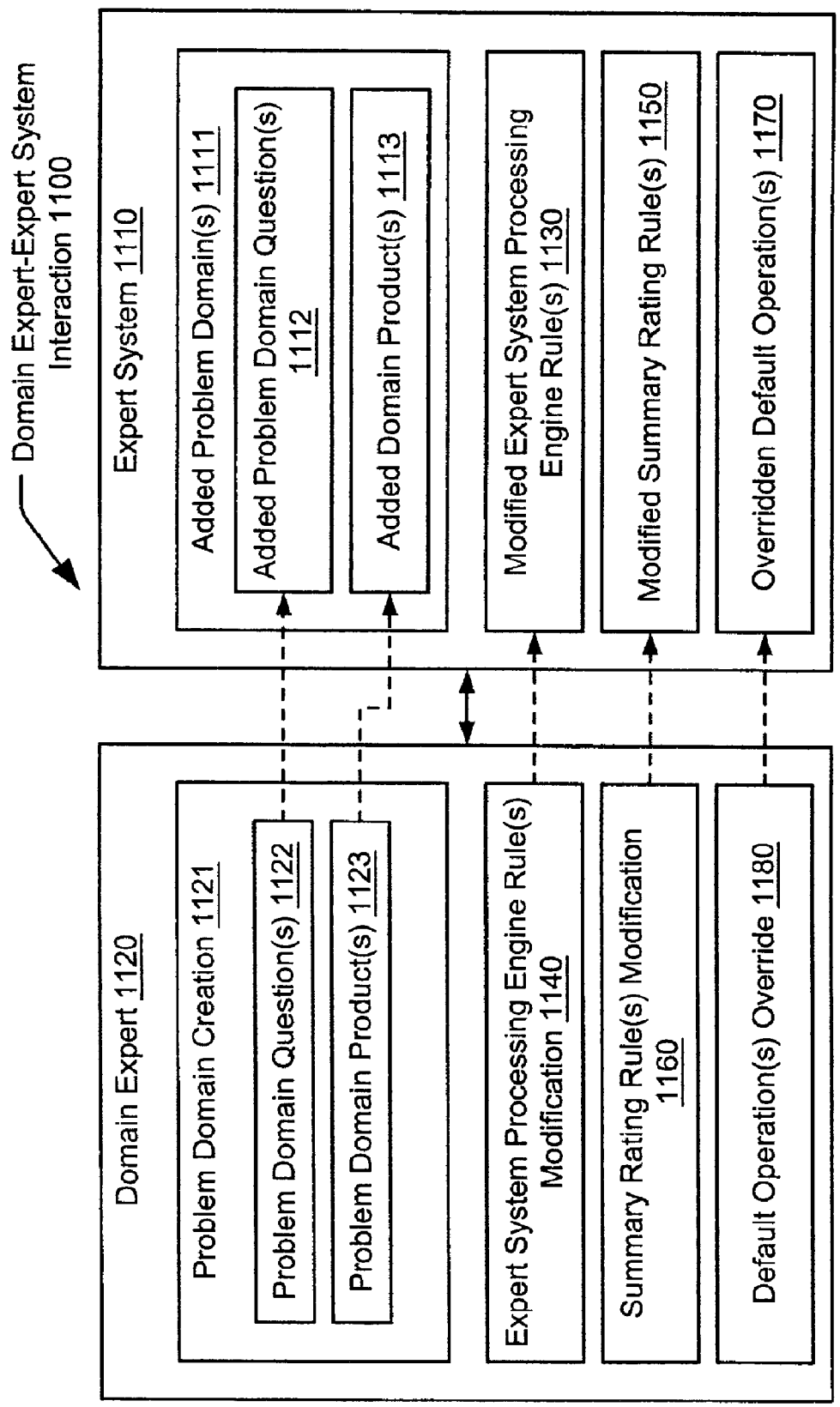
FIG. 11 is a system diagram illustrating an embodiment of interaction between a domain expert and an expert system in accordance with certain aspects of the present invention.

FIG. 11 is a system diagram illustrating an embodiment of interaction between a domain expert and an expert system 1100 in accordance with certain aspects of the present invention. A domain expert 1120 is authorized to identify, or create, the various problem domains for use within an expert system 1110. To perform problem domain creation 1121, the domain expert 1120 uses problem domain question(s) 1122 and can present those in light of the problem domain product(s) 1123 that are available that may provide a solution for the problem domain. In light of the creation of the problem domains 1121 by the domain expert, the expert system 1110 will accommodate the added problem domain(s) 1111. The problem domain question(s) 1122 and the problem domain product(s) 1123 results in added problem domain question(s) 1112 and added domain product(s) 1113 within the added problem domain(s) 1111 within the expert system 1110.

In this embodiment, the domain expert 1120 is also afforded the ability to perform expert system processing engine rule(s) modification 1140 for the processing engines employed by the expert system 1110. The modified processing engine rule(s) 1130 are then employed by the expert system 1110. Similarly, the domain expert 1120 is also afforded the ability to perform summary rating rule(s) modification 1160 for the summary rating operations within the expert system 1110. The modified summary rating rule(s) 1150 are then employed by the expert system 1110. Moreover, the domain expert 1120 is also afforded the ability to override default operation(s) 1180 for the default operations to be performed by the expert system 1110. The overridden default operation(s) 1170 are then employed within the default operations of the expert system 1110.

In addition to the robustness, variability, and adaptability of an expert system that is built in accordance with the invention, such an expert system has been generated in light of a number of goals as well. The expert system is operable to change its recommendations smoothly as the inputs change. For example, adding one more employee to a site should not lead to drastic changes to the recommendations. The expert system is operable to accommodate minor changes and deviations of inputs without catastrophically failing, or by producing radically different output.

Moreover, a domain expert of relatively low skill level, or minimal computer training, is also to perform a number of tasks, some of which are enumerated in the FIG. 11. For example, the domain expert may easily add new problem domains, as shown in the problem domain creation functional block 1121. The domain expert is also able to add new traits to each problem domain. For example, this may include adding new questions to a GUI, such as a web page, and then transforming the answers into needs. The domain expert may also add new products to each of the problem domains, as desired. The domain expert may also modify the manner in which customer answers are converted into needs; this would also include deciding whether to employ fuzzy or non-fuzzy (crisp) values. The domain expert may also change the rule that creates summary ratings for a product based on its ratings for each trait, as illustrated in the summary rating rule modification functional block 1120 of the FIG. 11. The domain expert may also fine tune the rules to affect the recommendations made by the expert system as well.

As described above in many of the various embodiments, the expert system provided for sub-second response time in its own code (not counting network traffic) for any input-to-recommendation transaction. This enables real time interaction between agent and customer. In addition, the expert system is able to provide explanation for the reasons that lead to particular recommendations.

Figure 12:
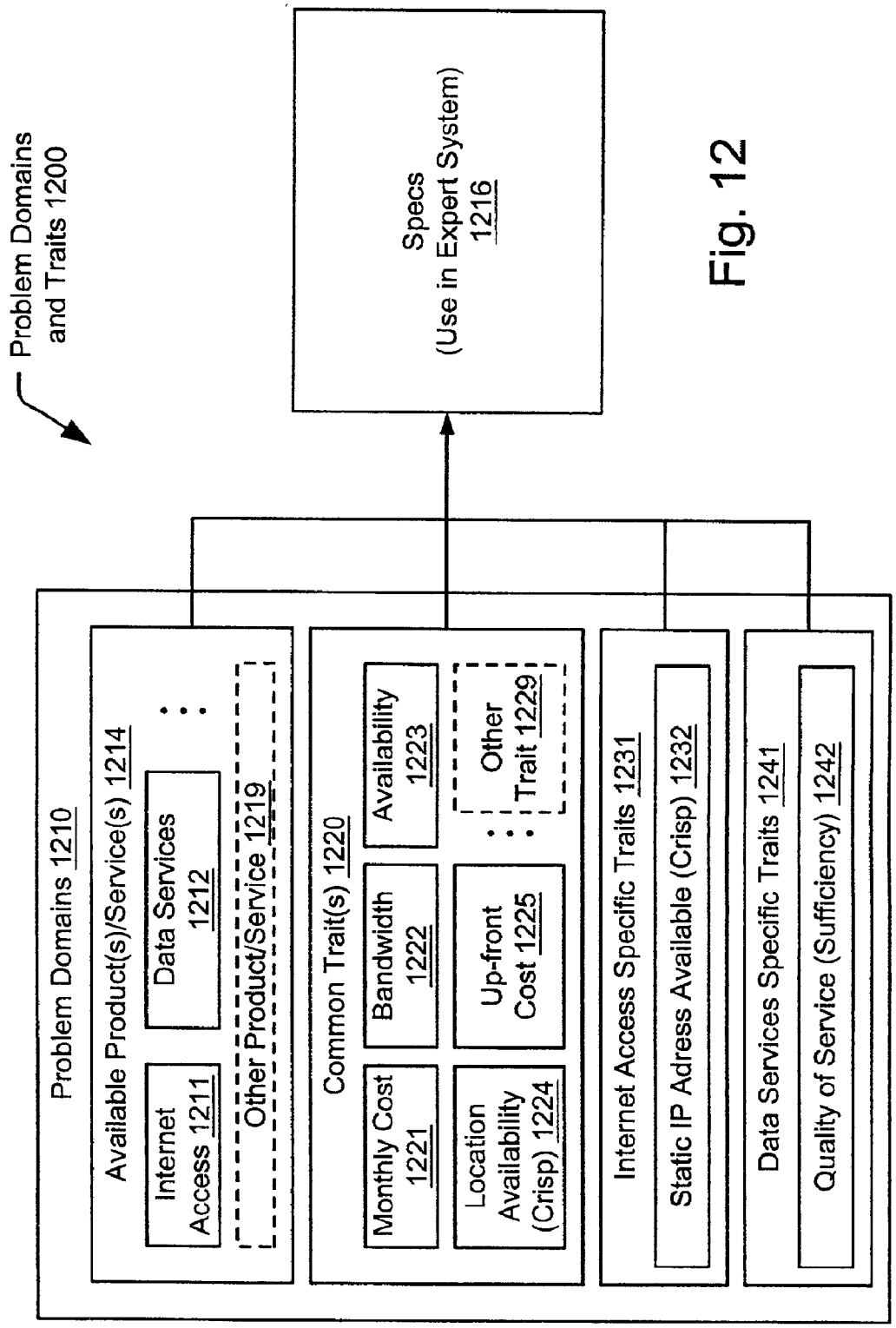
FIG. 12 is a block diagram illustrating an embodiment of definitions of problem domains and traits that are usable within an expert system that is built in accordance with certain aspects of the present invention.

FIG. 12 is a block diagram illustrating an embodiment of definitions of problem domains and traits 1200 that are usable within an expert system that is built in accordance with certain aspects of the present invention. In this embodiment, an example of problem domains 1210 is shown for any number of available product(s)/service(s) 1214. The available product(s)/service(s) 1214 includes Internet access 1211 and data services 1212. In addition, the available product(s)/service(s) 1214 may also include any other product/service 1219 as well.

For the Internet access 1211 and data services 1212 share a number of common trait(s) 1220, and each of the Internet access 1211 and data services 1212 has specific traits as well. Examples of common trait(s) 1220 shared between them include monthly cost 1221, bandwidth 1222, availability 1223, location availability (crisp) 1224, and up-front cost 1225. In addition, any other trait 1229 may also be included or adapted for a given situation or application. An example of Internet access specific traits 1231 includes whether a static Internet protocol address is available (crisp) 1232 for the customer. An example of data services specific traits 1241 includes whether a quality of service, or sufficiency of the quality of service, 1242 is appropriate for a given situation or application to meet a customer's needs or desires. All of the information within the problem domain 1210 is provided via specs 1216 for use in an expert system. The expert system is any expert system as described in any of the various embodiments of the invention.

Figure 13:
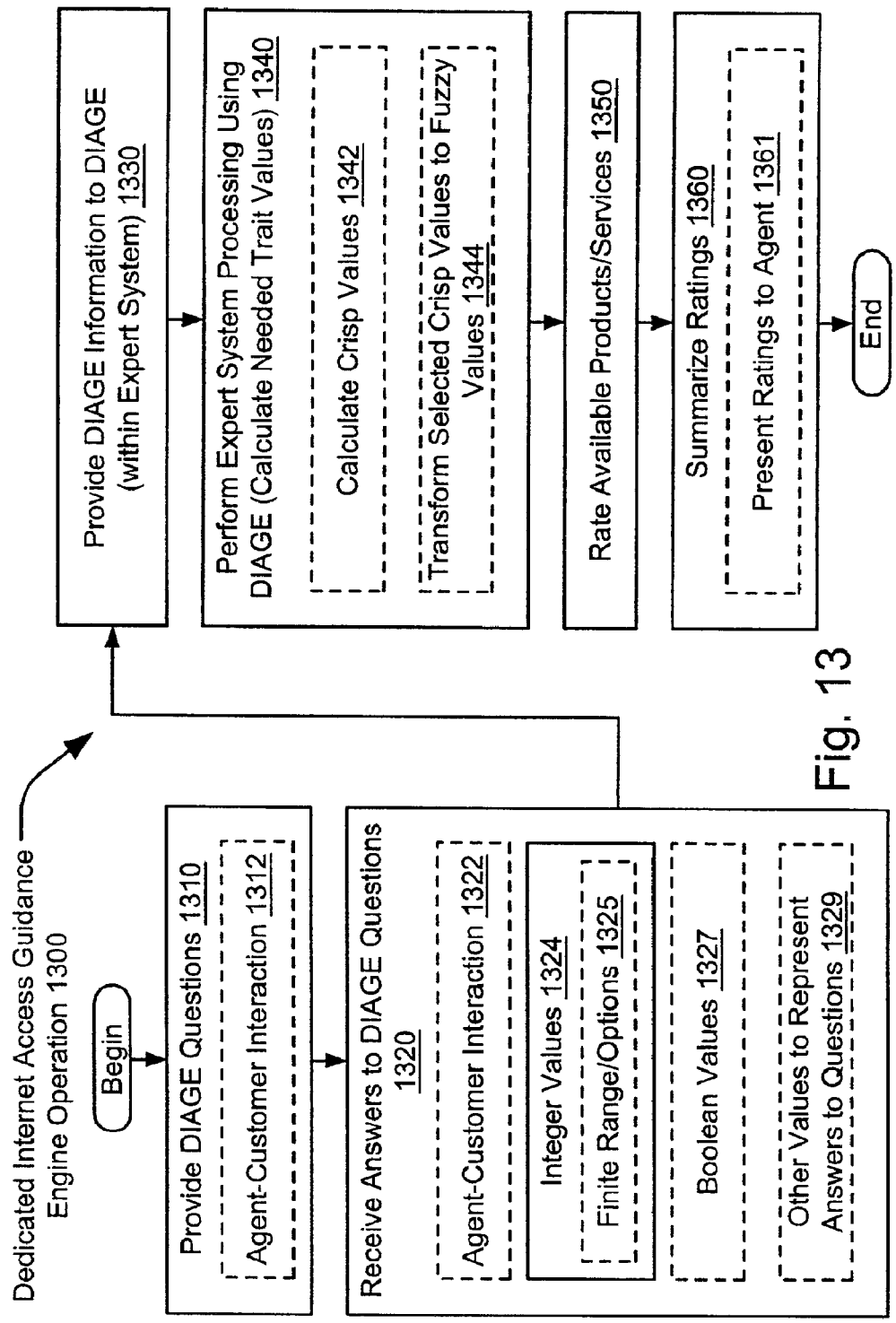
FIG. 13 is a block diagram illustrating an embodiment of dedicated Internet access guidance engine operation that is performed in accordance with certain aspects of the present invention.

FIG. 13 is a block diagram illustrating an embodiment of dedicated Internet access guidance engine operation 1300 that is performed in accordance with certain aspects of the present invention. In a block 1310, a number of dedicated Internet access guidance engine (DIAGE) questions are provided. They are provided via agent-customer interaction 1312 in certain embodiments. Again, this agent-customer interaction 1312 may very well be performed in real time, if desired. Alternatively, the dedicated Internet access guidance engine questions may be provided to a customer offline, and the customer then returns the information to the dedicated Internet access guidance engine for processing that uses that information.

Subsequently, after those questions have been answered, those answers are received in a block 1320. Again, this may be performed using agent-customer interaction 1322. The agent-customer interaction 1322 may be in real time, offline, or in any other manner. The answers to the questions are received as integer values 1324. In addition, for some of the integer values 1324, there are finite range/options 1325 from which the integer values 1324 may be selected. For example, one of three integer values 1324 may serve as the selections of the finite range/options 1325. Alternatively, a maximum value and minimum value may bound the operable range of the finite range/options 1325 as well. If desired in alternative embodiments, the answers to the questions are received as Boolean values 1327. In using the Boolean values 1327, comparison using Boolean algebra, as understood in the art, for performing various aspects of the dedicated Internet access guidance engine processing. In addition, any other values may be employed to represent answers to these questions, as shown in a block 1329.

Afterwards, the dedicated Internet access guidance engine information is then provided to the dedicated Internet access guidance engine for processing, as shown in a block 1330. The dedicated Internet access guidance engine is viewed as being contained within the expert system from certain perspectives. Alternatively, the dedicated Internet access guidance engine operates cooperatively with the expert system, yet is a separate processing module. Either embodiment is operable without departing from the scope and spirit of the invention.

Then, in a block 1340, processing is actually performed using the dedicated Internet access guidance engine. Within the block 1340, trait values are calculated for each of the necessary traits to perform dedicated Internet access guidance engine processing. Also within the block 1340, a number of crisp values may be calculated, as shown within a block 1342. Then, as needed, certain of the crisp values are transformed into fuzzy values for use within the dedicated Internet access guidance engine processing performed within the expert system, as shown in a block 1344. The expert system is operable to perform processing using both crisp and fuzzy values.

Then, in a block 1350, the available products and/or services are rated based on the expert system processing using the dedicated Internet access guidance engine that was performed in the block 1340. In the block 1350, some of the products and/or services that geared to provide Internet access are rated as being recommended, compatible, and not recommended. Some of the products and/or services are disqualified altogether, as will be also described below in various embodiments of the invention, when an option within the available products and/or services fails to meet a particular need of a customer needing Internet access.

Ultimately, in a block 1360, the Internet access solutions, based on the available products and/or services geared to provide Internet access, are then summarized as shown in a block 1380. If desired, these remaining configurations may then be presented to an agent as shown in a block 1361.

Figure 14:
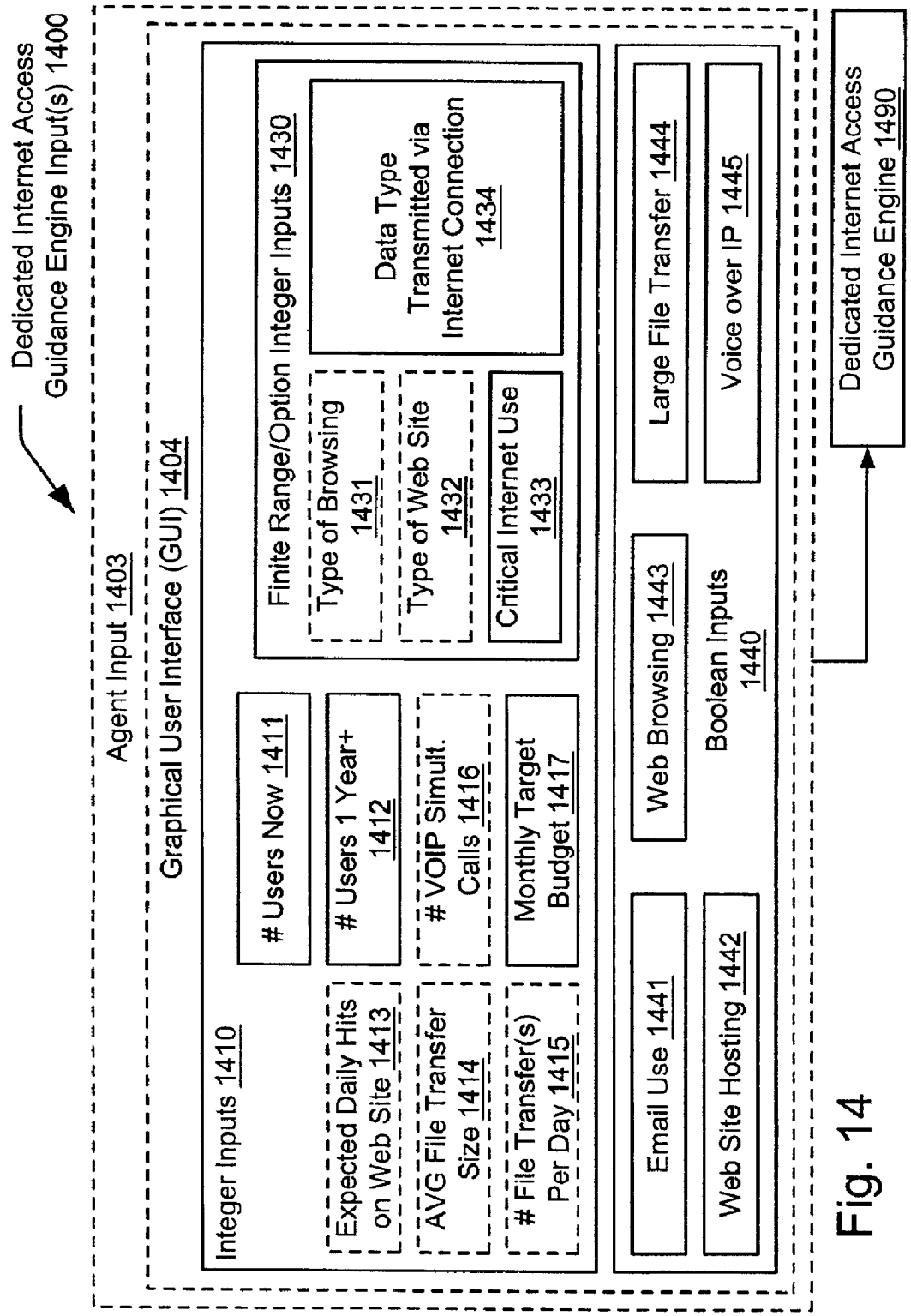
FIG. 14 is a system diagram illustrating an embodiment of some inputs used by a dedicated Internet access guidance engine that is built in accordance with certain aspects of the present invention.

FIG. 14 is a system diagram illustrating an embodiment of some inputs 1400 used by a dedicated Internet access guidance engine 1490 that is built in accordance with certain aspects of the present invention. In certain embodiments of the invention, the dedicated Internet access guidance engine 1490 assumes that these inputs 1400 are provided before operation of the dedicated Internet access guidance engine 1490 commences. If desired, these inputs 1400 may be input by an agent as agent input 1403. Moreover, the manner of input may be performed via GUI 1404. Other means of inputting this information may be performed as well.

This dedicated Internet access guidance engine 1490 finds solutions for Internet connections for small and medium sized businesses. If desired, the dedicated Internet access guidance engine 1490 as also adaptable to provided Internet connection solutions for larger businesses as well. The dedicated Internet access guidance engine 1490 relies on answers to the number of questions. These questions and answers may be the many questions that are asked and answered in the blocks 1310 and 1320 of the FIG. 13.

The inputs 1400 include both integer inputs 1410 and Boolean inputs 1440 for use within the dedicated Internet access guidance engine 1490. As shown in a block 1410, the integer inputs 1410 include a number of inputs, some of which are finite range/option integer inputs 1430.

The information for the number of people who now use the Internet is shown in a block 1411, as being one of the integer inputs 1410. This information may be acquired by seeking an answer to the following question: How many people will be using Internet access at this location presently? In addition, the information for the number of people who will probably be using the Internet after a certain or fixed period of time may be used as one of the integer inputs 1410. A one-year time frame is used in one instance as shown in a block 1412, but other time periods may also be used without departing from the scope and spirit of the invention. This information may be acquired by seeking an answer to the following question: How many people will be using Internet access at this location one year later?

As for some of the Boolean inputs 1440, information for whether the Internet will be used for email as shown in a block 1441. This information may be acquired by seeking an answer to the following question: Will the Internet be used for email? Another one of the Boolean inputs 1440 includes information for whether the Internet will be used for web browsing as shown in a block 1443. This information may be acquired by seeking an answer to the following question: Will the Internet be used for web browsing?

Then, based on if the Internet will indeed be used for web browsing, information for what type or kind of Internet browsing will be performed is acquired as shown in a block 1431, as also being one of the Boolean inputs 1440. This information may be acquired by seeking an answer to the following question: What kind of browsing will most users be doing? The finite range/option of the kind of Internet browsing 1431 may be categorized as Light use (infrequent/casual browsing), Standard use (news, search engines, etc), and Heavy use (video conferencing, streaming video, etc.), thereby having three finite options that may be selected. Other categories may also be employed without departing from the scope and spirit of the invention. From certain perspectives, this information may be viewed as only being acquired when the information regarding web browsing 1443 is returned as true.

Another of the Boolean inputs 1440 includes whether the Internet will be used to host a web site, as shown in a block 1442. This information may be acquired by seeking an answer to the following question: Will the Internet be used for hosting a web site? If web site hosting is to be performed, then it is further determined the type of web site hosting, as shown in a block 1432 within the finite range/option integer inputs 1430. This information may be acquired by seeking an answer to the following question: What kind of web site will be running? The finite range/option of the type of web site hosting 1432 may be categorized as Light content (primarily text, few graphics), Typical content (text and graphics), and Heavy content (Multimedia, large graphics, streaming video, etc.), thereby having three finite options that may be selected. Other categories may also be employed without departing from the scope and spirit of the invention. From certain perspectives, this information may be viewed as only be acquired when the information regarding web site hosting 1442 is returned as true.

Other integer input information that is acquired includes the number of expected daily hits on the web site 1413. This information may be acquired by seeking an answer to the following question: How many site hits per day are expected? Again, this information may be viewed as only be acquired when the information regarding web site hosting 1442 is returned as true.

Another of the Boolean inputs 1440 includes information concerning whether the Internet will be used to perform large file transfers, as shown in a block 1444. A threshold governing what will or will not be considered a large file transfer may also be employed to assist in this Boolean determination. This information may be acquired by seeking an answer to the following question: Will the Internet be used for large file transfers?

Another of the integer inputs includes the average file transfer size 1414. This information may be acquired by seeking an answer to the following question: What is the average file size? The file size determination is made in Mbytes in one embodiment; it may be made using other file sizes measurements as well without departing from the scope and spirit of the invention. This information concerning average file transfer size 1414 may be viewed as only be acquired when the information regarding large file transfer 1444 is returned as true. Yet another of the integer inputs includes the number of file transfer(s) per day 1415. This information may be acquired by seeking an answer to the following question: How many files will be transferred per day? This information concerning number of file transfer(s) per day 1415 may be viewed as only be acquired when the information regarding large file transfer 1444 is returned as true.

Another of the Boolean inputs 1440 includes information concerning whether the Internet will be used to support the voice over Internet protocol (VOIP), as shown in a block 1445. This information may be acquired by seeking an answer to the following question: Will the Internet be used for voice over IP?

Another of the integer inputs includes the number of voice over Internet protocol calls that must be supported simultaneously, as shown in a block 1416. This information may be acquired by seeking an answer to the following question: How many simultaneous calls will need to be supported? This information concerning number of voice over Internet protocol calls that must be supported simultaneously, as shown in a block 1416, may be viewed as only be acquired when the information regarding voice over Internet protocol (VOIP) 1445 is returned as true.

Another of the integer inputs includes how critical Internet use is to a business's success or failure, as shown in a block 1433. This measure is a way of trying to capture the degree of importance of Internet use to the operations of the business. This information may be acquired by seeking an answer to the following question: How critical is the Internet to the business? The finite range/option of the critical Internet use 1433 may be categorized as Outage is a minor inconvenience, Outage may disrupt business but revenue will not be lost, and Outage causes operations to fail or revenue to be lost, thereby having three finite options that may be selected.

In addition, another of the integer inputs includes determining what data type is to be transmitted via the Internet connection, as shown in a block 1434. This information may be acquired by seeking an answer to the following question: What type of data will be transmitted over this Internet connection? The finite range/option of the data type transmitted via the Internet connection 1434 may be categorized as Normal data (including general e-mail, web browsing, business documents), Sensitive data (including confidential records, credit card numbers, customer orders), and Critical data (including monetary transactions, etc.).

Also, information concerning the monthly target budget for the customer is shown in a block 1417. This information may be acquired by seeking an answer to the following question: What is the customer's target monthly budget?

The information, shown within the FIG. 14, is provided by the user and is then used in a number of equations to calculate the value needed for each of a number of traits to try to determine an Internet access solution using the dedicated Internet access guidance engine. In certain embodiments of the invention, the number of traits includes 4 different traits which are (1) cost, (2) bandwidth, (3) reliability, and (4) ability to host a web site. The cost and bandwidth traits are employed as continuous variables. Reliability is employed as having 3 possible fuzzy values (low, medium and high), and the ability to host a web site is employed as a Boolean trait.

Figure 15:
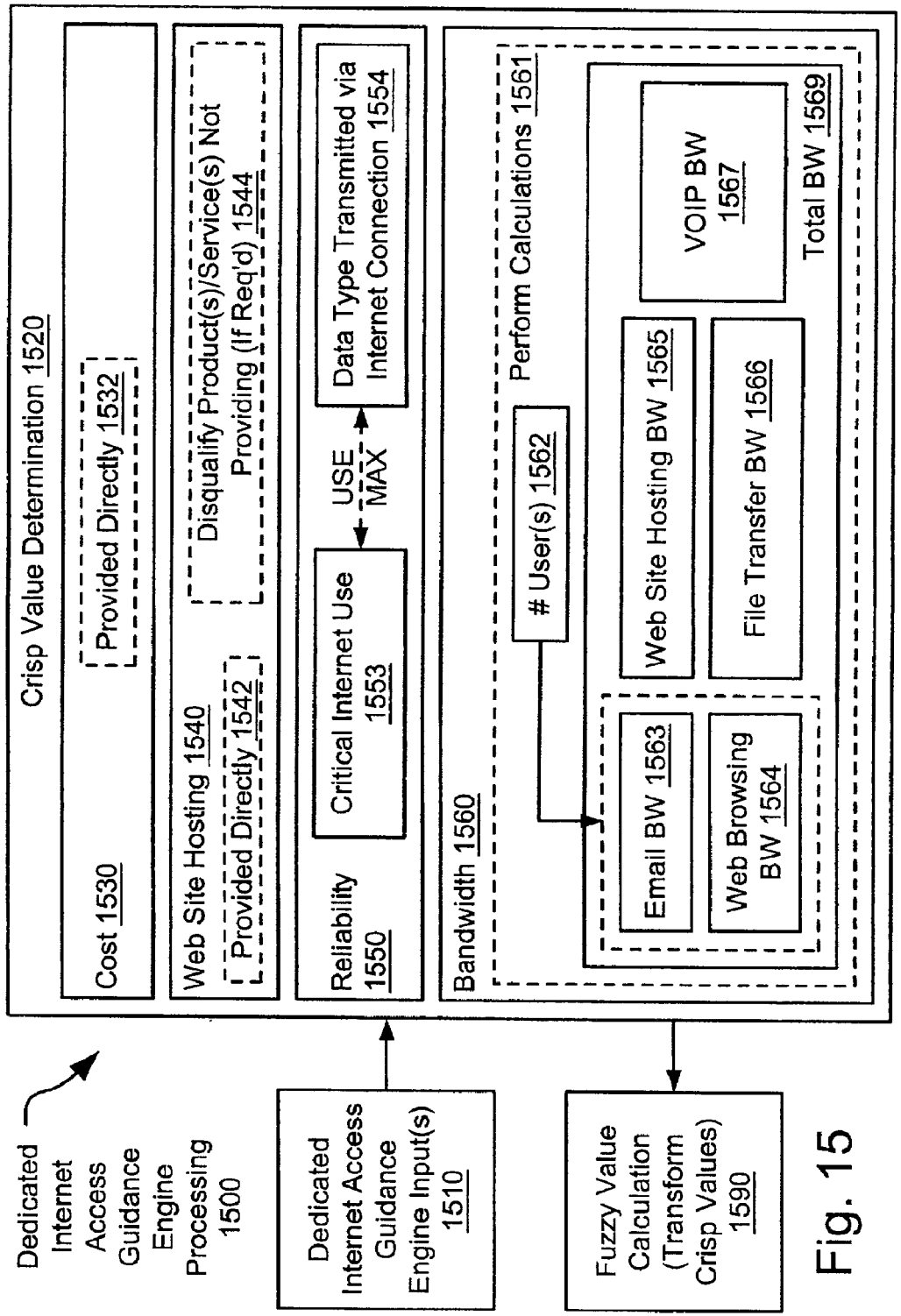
FIG. 15 is a functional block diagram illustrating an embodiment of dedicated Internet access guidance engine processing that is performed in accordance with certain aspects of the present invention.

FIG. 15 is a functional block diagram illustrating an embodiment of dedicated Internet access guidance engine processing 1500 that is performed in accordance with certain aspects of the present invention. A number of dedicated Internet access guidance engine input(s) 1510 are provided first to perform crisp value determination, as shown in a block 1520. The dedicated Internet access guidance engine input(s) 1510 are the dedicated Internet access guidance engine input(s) 1410 inputs provided within the FIG. 14 in certain embodiments of the invention.

Then, fuzzy value calculation, shown in a block 1590, is performed by transforming a predetermined, or selected, group of the resulting crisp values generated within the crisp value determination functional block 1520. The crisp value determination 1520 includes calculating crisp values for at least four traits, namely, cost 1530, web site hosting 1540, reliability 1550, and bandwidth 1560. For many of these traits, there are calculations to be performed.

In some embodiments and for some of the traits, very little calculation, or no calculation is required as the trait value is provided directly within the dedicated Internet access guidance engine input(s) 1510. For example, cost 1530 is provided directly, as shown in a block 1532. The direct provision of the cost 1530 is within the dedicated Internet access guidance engine input(s) 1510. No calculation is required, and no equations are employed within the crisp value calculation 1520 in such embodiments.

The web site hosting 1540 may also be provided directly, as shown in a block 1542. Again, in such embodiments, no calculation is required, and no equations are employed within the crisp value determination 1520 when the web site hosting 1540 information is provided directly 1542. From certain perspectives, the need to host a web site (shown in the block 1540) is also directly given in a question; the question may be selected from either of the embodiments of the FIG. 13 or the FIG. 14. In one embodiment, this information (web site hosting 1540) is the only trait that is not treated in a fuzzy manner. If a user needs to host a web site, and a technology does not provide for it, then that technology is immediately disqualified. This is shown in a block 1544. Available product(s)/service(s) are immediately disqualified if web site hosting 1540 is required by a customer, as shown in the block 1544.

The crisp value for reliability 1550 may be calculated relatively easily. The reliability 1550 may be determined by incorporating information gained from two questions; again, the questions may be selected from either of the embodiments of the FIG. 13 or the FIG. 14. In one embodiment, a determination of critical Internet use 1553 and the data type to be transmitted via the Internet connection 1554 are used to set the value of the reliability 1554. In certain embodiments of the invention, the determination of critical Internet use 1553 and the data type to be transmitted via the Internet connection 1554 are critical Internet use 1433 and the data type transmitted via the Internet connection 1434, respectively, of the FIG. 14.

The determination of the bandwidth 1560 within crisp value determination 1520 may involve performing calculations, as shown in a block 1561. Initially, a determination of the number of user(s) 1562 is made. If desired, this determination of the determination of the number of user(s) 1562 involves information of the total number of present users of the Internet as well as the projected number of Internet users after a predetermined period of time. In certain embodiments of the invention, total number of present Internet users and the projected number of Internet users after a predetermined period of time are the number of people who now use the Internet 1411 and the number of people who will probably be using the Internet a predetermined of time from the present is shown in a block 1412 (such as one-year in the future), respectively, of the FIG. 14. If desired, these two values are used in a weighted averaging calculation. One example of portion of programming that may be used to calculate the number of user(s) 1562 is as follows:

Calculate number_of_users:

number_of_users=0.75*(number_of_users_year−number_of_users_now)+number_of_users_now The resulting number of user(s) 1562 is used in many of the subsequent calculations. For example, in calculating the email bandwidth 1563, the number of user(s) 1562 is employed in some embodiments. One example of portion of programming that may be used to calculate the email bandwidth 1563 is as follows:

```
Calculate kbps_for_email:
    If not has_email:
        kbps_for_email=0
    else:
        kb_per_item=20
        items_per_day_per_person=100
        kb_per_day_person=kb_per_item*items_per_day_per_person
        kbps_per_person=(kb_per_day_person*1.024*8)/(12*3600)
        kbps_for_email=kbps_per_person*number_of_users
```

In calculating the web browsing bandwidth 1564, the number of user(s) 1562 is also employed in some embodiments; in addition, the type of web hosting that is to be supported may also be one of the parameters used to perform these calculations, and this value (web_browsing_type) may be represented as being light, typical, or heavy (as will also be shown below). One example of a portion of programming that may be used to calculate the web browsing bandwidth 1564 is as follows:

```
Calculate kbps_for_web_browsing:
    if not has_web_browsing:
        kbps_for_web_browsing=0
    else:
        if web_browsing_type==0: (Use 0=Light, 1=Typical, and 2=Heavy)
            kb__per_request=8.19
        elif web_browsing_type==1:
            kb_per_request=50.0
        elif web_browsing_type==2:
            kb_per_request=80.0
        requests_per_minute=4.0
        kb_per_min_requested_per_person=kb_per_request*requests_per_minute
        kb_required_per_person=kb_per_min_requested_per_person* 1.024* 8.0/60.0
        using_at_same_time_during_peak=0.4
        kbps_per_person_net=using_at_same_time_during_peak*kb_required_per_person
        real_kbps=kb_required_per_person*number_of_users*using_at_same_time_during_peak
        min_kbps=56
        kbps_for_web_browsing=max(min_kbps, real_kbps)
```

To calculate the web site hosting bandwidth 1565, one example of a portion of programming that may be used is shown as follows:

```
Calculate kbps_for_web_site_hosting:
    if not has_hosting_website:
        kbps_for_web_site_hosting=0.0
    else:
        min_kbps        =128.0
        page_size       =35.0
        hits_per_day=hosting_website_hits
        if hosting_website_type==0:
            page_size=35.0
            min_kbps=128.0
        elif hosting_website_type==1:
            page_size=50.0
            min_kbps=256.0
        elif hosting_website_type==2:
            page_size=75.0
            min_kbps=512.0
        kb_per_day=hits_per_day*page_size*1.024*8.0
        real_kbps=kb_per_day/(18*60*60)
        kbps_for_web_site_hosting=max(min_kbps, real_kbps)
```

To calculate the file transfer bandwidth 1566, one example of a portion of programming that may be used is shown as follows:

```
Calculate kbps_for_file_transfers:
    if not has_file_transfers:
        kbps_for_file_transfers=0.0
    else:
        MB=1048576.0
        min_bw=((file_transfers_size*MB*8.0)/1000.0)/(5.0*60.0)
        target_bw=((file_transfers_size*MB*8.0*file_transfers_count)/
            1000.0)/(12.0*60.0*60.0)
        kbps_for_file_transfers=max(min_bw, target_bw)
```

To calculate the voice over Internet protocol bandwidth 1567, one example of a portion of programming that is shown as follows:

```
Calculate kbps_for_voice_over_ip:
    if not has_voice_ip:
        kbps_for_voice_over_ip=0.0
    else:
        simultaneous_calls=voice_ip_count
        G729_RTP_compression=12.0
        kbps_for_voice_over_ip=simultaneous_calls*G729_RTP_compression
```

Then, once each of the values for the email bandwidth 1563, web browsing bandwidth 1564, web site hosting bandwidth 1565, file transfer bandwidth 1566, and the voice over Internet protocol bandwidth 1567 have been calculated, they are all used to calculate a total bandwidth 1569. To calculate the total bandwidth 1569, one example of a portion of programming that is shown as follows:

```
Calculate total_kbps:
    Total_kbps=kbps_for_email+kbps_for_web_browsing+kbps_for_web_site_hosting+
    kbps_for_file_transfers+kbps_for_voice_over_ip
```

The operations within the fuzzy value calculation functional block 1590 may be viewed, in one embodiment, as described below. To this point, crisp values that represent the needs of a customer have been used. However, there is a finite number of available products/services that may serve the customer's needs of Internet access. That is to say, there is a set of products with values for cost, reliability, ability to host a web site, and bandwidth. Each product provides a crisp value for each of these traits. Yet, it is desirable to employ fuzzy logic (that employs fuzzy values) to enable rating of the various products and/or services using the dedicated Internet access guidance engine.

One example of a portion of programming that may be used to transform cost of a product into a fuzzy trait is shown as follows:

```
cost_fuzzy_variable=fuzzy.Variable('cost', '$', 0, 50000.0)
fuzzy_cost=fuzzy.Value(
    fuzzy.Set(0/0, 0.1/cost*0.6, 0.9/cost, 1/cost_fuzzy_variable.upper),
    cost_fuzzy_variable)
```

Where cost is the crisp cost value.

One example of a portion of programming that may be used to transform effective bandwidth of a product into a fuzzy trait is shown as follows:

```
kbps_fuzzy_variable=fuzzy.Variable('bandwidth', 'kbps', 0, 45000.0)
fuzzy_kbps=fuzzy.Value(
    fuzzy.Set(1/0, 0.9/kbps*0.95, 0.1/kbps, 0/kbps*10),
    kbps_fuzzy_variable)
```

One example of a portion of programming that may be used to transform a fuzzy trait for reliability 1550 is shown below. Reliability is treated as a fuzzy value for which all possible combination of product offering (low=0, medium=1, high=2) and customer need (low=0, medium=1 and high=2) have been pre-calculated by the following function:

```
Function rate_reliability(user_needs, product_provides):
    If user_needs<product_provides: return 1
    If user_needs>product_provides: return 0
    If user_needs=product_provides: retrun 0.9
```

For cost and reliability, the corresponding fuzzy value for the product is used to calculate the membership value of the user need and that value is used as the level of customer satisfaction.

Figure 16:
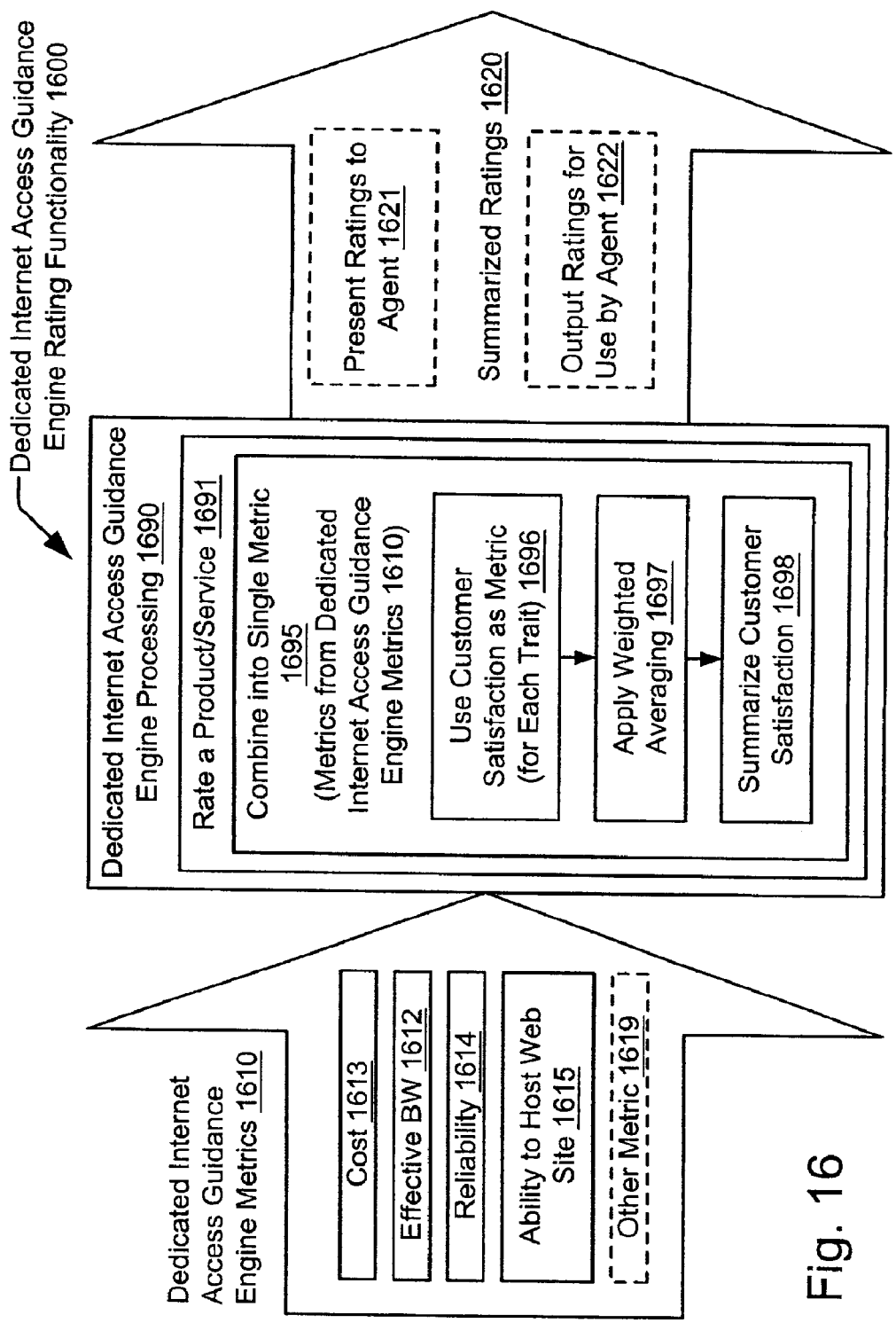
FIG. 16 is a block diagram illustrating an embodiment of dedicated Internet access guidance engine rating functionality that is performed in accordance with certain aspects of the present invention.

FIG. 16 is a block diagram illustrating an embodiment of dedicated Internet access guidance engine rating functionality 1600 that is performed in accordance with certain aspects of the present invention. In one embodiment, the dedicated Internet access guidance engine employs dedicated Internet access guidance engine metrics 1610 to perform dedicated Internet access guidance engine processing 1690. As shown by the dedicated Internet access guidance engine metrics 1610, several metrics may be used. In some embodiments, 4 metrics are used. In addition, any other metric 1619 may also be used. Exemplary metrics are cost 1613, effective bandwidth 1612, reliability 1614, and ability to host a web site 1615. Again, any other metric 1619 may be used as well for the dedicated Internet access guidance engine metrics 1610 without departing from the scope and spirit of the invention.

The dedicated Internet access guidance engine processing 1690 includes the rating of a product and/or service 1691. In performing the rating of the product and/or service 1691, the various metrics used are combined into a single metric 1695. That is to say, the dedicated Internet access guidance engine metrics 1610 are combined into a single metric as shown in the block 1695. In this embodiment, the configuration is rated using the 4 different criteria (cost 1613, effective bandwidth 1612, reliability 1614, and ability to host a web site 1615), and there is a need to summarize these various metrics to obtain a single rating. It is also important to use a metric or metrics that is or are easy to combine.

One metric that is used in accordance with certain aspects of the invention is a level of customer satisfaction, shown as a metric in a block 1696. The level of customer satisfaction may be used as a metric for each of the traits employed within the expert system. As described in various other aspects of the invention, similar operations may be performed using a data network guidance engine. Then, weighted averaging is employed as one method in which to combine the various customer level of satisfaction metrics, as shown in a block 1697. Again, the resulting customer satisfaction levels for each trait may be summarized with weighted averages as in embodiments of the invention described in a data network guidance engine as well. Ultimately within the single metric combination of the block 1695, the customer satisfaction is then summarized as shown in a block 1698.

The dedicated Internet access guidance engine rating functionality 1600 then provides summarized ratings 1620 for use in various components of the dedicated Internet access guidance engine. These summarized ratings 1620 may include ratings that are presented to an agent 1621, and also ratings that are output for use by an agent as shown in a block 1622. For example, the ratings may be provided into an editable document, such as an MS WORD document for use by the agent in report preparation.

Figure 17:
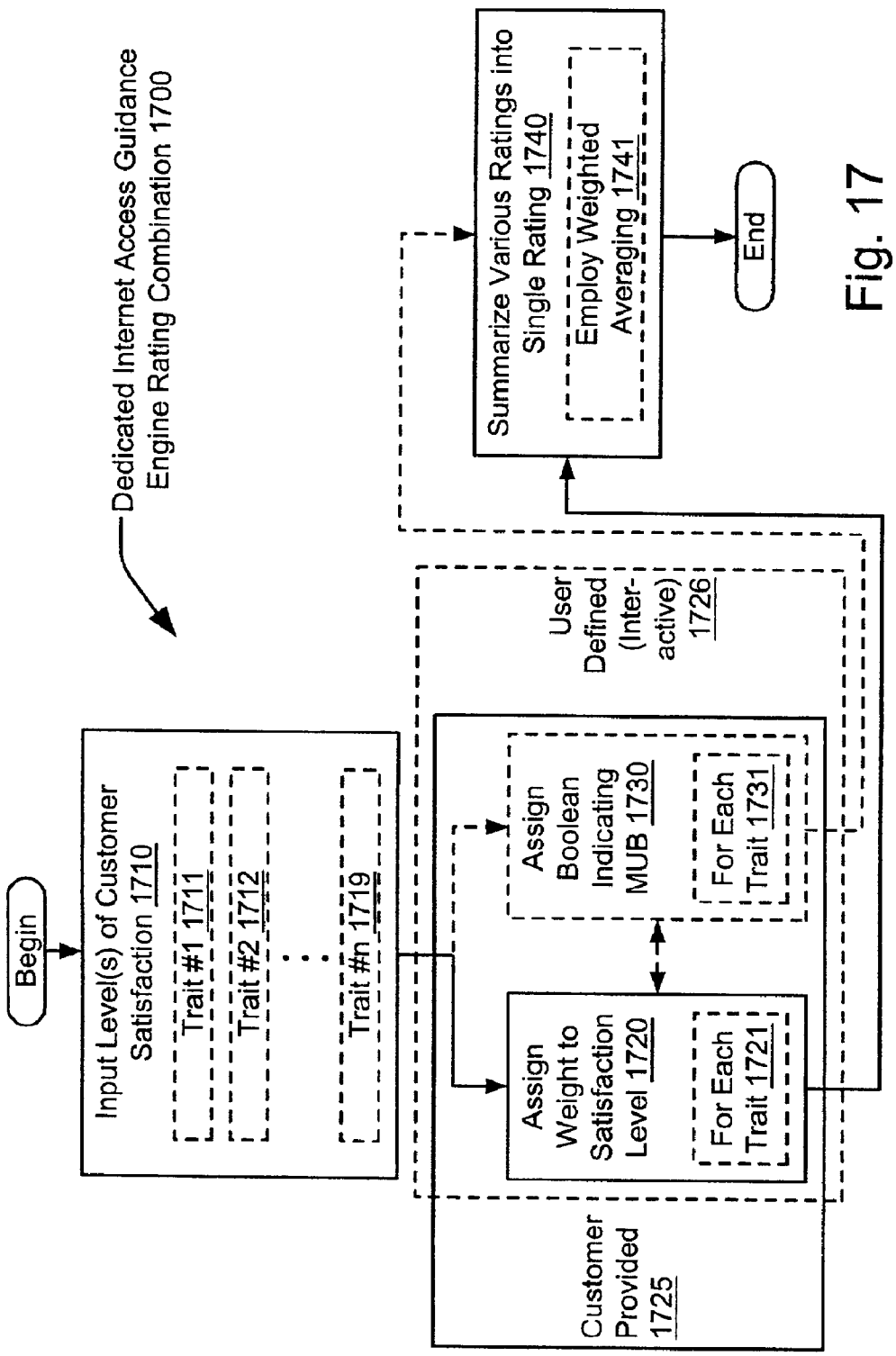
FIG. 17 is a block diagram illustrating an embodiment of dedicated Internet access guidance engine rating combination that is performed in accordance with certain aspects of the present invention.

FIG. 17 is a block diagram illustrating an embodiment of dedicated Internet access guidance engine rating combination 1700 that is performed in accordance with certain aspects of the present invention. In a block 1710, the level(s) of customer satisfaction are input. These levels of customer satisfaction may be provided in the block 1710 for any number of traits, shown as a trait #1 1711, a trait #2 1712, . . . , and a trait #n 1719. For the level(s) of customer satisfaction shown in the block 1710, a weight is assigned to the level(s) as shown in a block 1720. If desired, a Boolean is assigned to the level(s) indicating whether they are to be taken as a minimum upper bound or not, as shown in a block 1730. For both of the operations performed in the blocks 1720 and 1730, they may be performed on a per trait basis as shown in blocks 1721 and 1731, respectively.

The assignment of weights in the block 1720 and the alternative assigning of a Boolean in the block 1730 may be provided by a customer, or by a user, or agent, as shown in blocks 1725 and 1726. The input may be interactive for each, perhaps via a GUI in various embodiments of the invention. If desired, the user could be given the means to define these weights interactively for example by means of sliders in the page where the problem is submitted to the data network guidance engine.

Then, the various ratings are summarized into a single rating in a block 1740. If desired, weighted averaging is employed to generate the single rating as shown in a block 1741. If desired, the level of satisfaction for each trait is used and summarizes using a similar approach within the dedicated Internet access guidance engine as within the data network guidance engine case.

There are also many alternative means that may be employed to generate a summary rating without departing from the scope and spirit of the invention. The various means may be employed in a dedicated Internet access guidance engine and/or also within a data network guidance engine, among other guidance engines envisioned within the scope and spirit of the invention.

Given the input on a user needs, and any given product p, and also assuming there are levels of customer satisfaction h1, h2, . . . , hn for each of the n traits. Then, a generalized mean function may be used as follows:

$$(w1*h1**alpha+w2*h2**alpha+ \ldots +wn*hn**alpha)/(w1+w2+ \ldots +wn)$$

This may be used to calculate the summary rating for that product with respect to the user needs. The notation is as follows:

wi is the weight assigned to trait i

\* means multiplication

\*\* means exponentiation alpha is a real number other than zero. Alpha is chosen with the following mathematical results in mind:

As alpha tends to infinity, the result of the generalized mean tends to max(h1, h2, . . . , hn)

If alpha=1, the generalized mean yields a normal weighted average.

In the limit where alpha tends to zero, the generalized mean tends to the geometric mean If alpha=−1, the generalized mean yields a harmonic mean As alpha tends to minus infinity, the result of the generalized mean tends to min(h1, h2, . . . , hn).

In one embodiment employed for a data network guidance engine, alpha=−2.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A method for recommending a product to a customer, the method comprising:
   a) presenting a set of problem questions to a customer, the set of problem questions including one or more questions presented to determine one or more product needs of the customer;
   b) receiving a set of problem answers from the customer, the set of problem answers including one or more answers to the set of problem questions, the one or more answers corresponding to the one or more product needs of the customer;
   c) determining a problem domain based at least in part on the set of problem answers;
   d) presenting a set of needs questions to the customer, the set of needs questions including one or more questions corresponding to the determined problem domain;
   e) receiving a set of needs answers from the customer, the set of needs answers including one or more answers to the set of needs questions, each needs answer corresponding to at least one of the one or more product needs of the customer;
   f) transforming at least a part of the set of needs answers into one or more values to represent a set of product traits, the one or more values comprising at least one of a fuzzy value or a crisp value, at least a portion of the one or more values corresponding to at least one of the one or more product needs of the customer;
   g) processing at least one of the one or more values to produce one or more product recommendations, wherein the one or more product recommendations correspond to the determined problem domain, wherein at least a portion of the step of processing is performed on a computer processor using fuzzy logic; and
   h) providing at least one of the one or more product recommendations to the customer.

2. The method of claim 1, wherein at least one of the set of problem questions or the set of needs questions is presented to the customer in part by a human agent.

3. The method of claim 1, wherein the step of providing at least one of the one or more product recommendations to the customer is performed in part by a human agent.

4. The method of claim 1, further comprising:
   providing one or more explanations to the customer, at least one of the one or more explanations corresponding to at least one of the one or more products being recommended, the at least one of the one or more explanations comprising at least one reason as to why a corresponding product is being recommended.

5. The method of claim 1, wherein the one or more product recommendations includes one or more products that are designated as not recommended.

6. The method of claim 5, further comprising:
   providing one or more explanations to the customer, at least one of the one or more explanations corresponding to the one or more products that are designated as not recommended, the at least one of the one or more explanations comprising at least one reason as to why a corresponding product is being not recommended.

7. The method of claim 1, wherein the step of processing further comprises rating each of the products being recommended according to at least a portion of the needs answers.

8. The method of claim 7, wherein a certain number of product traits correspond to the one or more product needs of the customer, wherein the step of rating comprises determining the certain number of product traits corresponding to the one or more product needs of the customer.

9. The method of claim 8, wherein a plurality of product recommendations are produced, the step of processing further comprising providing a ranking for each product of the produced product recommendations, wherein the ranking is conducted in accordance with the determined certain number of product traits corresponding to the one or more product needs of the customer.

10. The method of claim 7, wherein each rating is selected from the group consisting of recommended, compatible, and not recommended.

11. The method of claim 1, wherein the one or more needs of the customer comprise telecommunications needs relating to at least one of cost, ability to host a website, reliability, or bandwidth.

12. The method of claim 11, wherein the needs relating to bandwidth include needs relating to at least one of e-mail, web browsing, website hosting, file transfer, or voice over internet protocol applications.

13. The method of claim 11, wherein the needs relating to reliability are characterized by values including at least one of a maximum value indicative of internet use by the customer or a maximum value indicative of a data type transmitted via the internet by the customer.

14. The method of claim 1, wherein at least one of the values is a crisp value comprising at least one of an integer value or a Boolean value.

15. The method of claim 1, wherein the step of transforming further comprises transforming at least one crisp value to a transformed fuzzy value to represent at least one of the product traits with the transformed fuzzy value.

16. The method of claim 1, wherein each trait of the product traits is defined by z fuzzy sets and s fuzzy sets.

17. The method of claim 1, wherein each customer has a physical location, wherein the step of processing includes processing information corresponding to the physical location of the customer in addition to the at least one of the one or more values.

18. The method of claim 1, wherein the step of processing further comprises accessing one or more product catalogs to compare at least a portion of the values to information stored in the one or more product catalogs.

19. The method of claim 18, wherein each product catalog comprises a database comprising information relating to a plurality of products.

20. The method of claim 19, wherein the information comprises available products, supported products, and compatible products.

21. The method of claim 19, wherein each product is provided by a product provider, wherein the catalog is configured to permit each product provider to provide updates to the information corresponding to at least one product provided by the product provider.

22. The method of claim 1, further comprising adding customer information to a customer profile, the customer profile being stored in a computer readable medium.

23. The method of claim 22, wherein the customer information comprises at least one of the one or more product needs of the customer, financial information about the customer, and products being used by the customer.

24. The method of claim 1, wherein the step of processing further comprises accessing a customer profile associated with the customer, the customer profile comprising information relating to the customer, wherein the customer profile is stored in a computer readable medium, wherein the one or more product recommendations are produced at least in part in accordance with the information in the customer profile.

25. The method of claim 1, further comprising attributing a weight to at least one of the one or more values.

26. The method of claim 25, wherein the weight represents a weight accorded by the customer to the product need corresponding to the weighted value.

27. A method for recommending a product to a customer, the method comprising:
 a) presenting a GUI to a human agent, the GUI including one or more fields for entry by the agent of information relating to a customer's product needs;
 b) receiving input from the agent via the GUI, the input comprising information relating to a customer's product needs;
 c) processing the received input through fuzzy logic to produce one or more product recommendations corresponding to the customer's product needs, the step of processing comprising transforming at least a part of the information relating to a customer's product needs into at least one of a fuzzy value or a crisp value; and
 d) displaying an output to the agent via the GUI, the output comprising the one or more product recommendations.

28. The method of claim 27, wherein the output further comprises one or more explanations, each explanation corresponding to at least one of the one or more product recommendations.

29. The method of claim 27, wherein the customer's product needs and the one or more product recommendations relate to telecommunications.

30. The method of claim 27, further comprising attributing a weight to at least one of the at least one of a fuzzy value or a crisp value.

31. A method for recommending a product to a customer, the method comprising:
 a) presenting a set of questions to a customer via a human agent, the set of questions comprising one or more questions relating to the customer's product needs;
 b) receiving a set of answers from the customer via the agent in response to the set of questions, the answers comprising one or more answers relating to the customer's product needs;
 c) entering information corresponding to the set of answers into a computer system via a GUI, the information being entered by the agent;
 d) receiving output from the computer system, the output being displayed to the agent via the GUI, the output being produced by the computer system, wherein the output is produced by the computer system via a process comprising:
  i) transforming at least a part of the set of answers into one or more values to represent a set of product traits, the one or more values comprising at least one of a fuzzy value or a crisp value, at least a portion of the one or more values corresponding to at least one of the one or more product needs of the customer, and
  ii) processing at least one of the one or more values to produce one or more product recommendations, wherein at least a portion of the step of processing is performed on a computer processor using fuzzy logic within the computer system,
 wherein the output comprises one or more product recommendations corresponding to the customer's needs; and
 e) presenting at least a portion of the output to the customer via the agent.

32. The method of claim 29, wherein the output further comprises one or more explanations, each explanation corresponding to at least one of the one or more product recommendations.

33. The method of claim 29, wherein the customer's product needs and the one or more product recommendations relate to telecommunications.

* * * * *